United States Patent
Thompson et al.

(10) Patent No.: US 10,380,319 B2
(45) Date of Patent: Aug. 13, 2019

(54) SUBLAMINATE LIBRARY GENERATION FOR OPTIMIZATION OF MULTI-PANEL COMPOSITE PARTS

(71) Applicant: The Boeing Company, Chicago, IL (US)

(72) Inventors: Richard Joel Thompson, Huntsville, AL (US); Adriana Willempje Blom-Schieber, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 90 days.

(21) Appl. No.: 15/399,187

(22) Filed: Jan. 5, 2017

(65) Prior Publication Data

US 2017/0228494 A1 Aug. 10, 2017

Related U.S. Application Data

(63) Continuation-in-part of application No. 15/018,075, filed on Feb. 8, 2016.

(51) Int. Cl.
*G06F 17/50* (2006.01)
*G05B 19/4097* (2006.01)
(Continued)

(52) U.S. Cl.
CPC ..... *G06F 17/5095* (2013.01); *G05B 19/4097* (2013.01); *B64C 1/12* (2013.01);
(Continued)

(58) Field of Classification Search
CPC ............ G06F 17/5095; G05B 19/4097; G05B 2219/35012
(Continued)

(56) References Cited

U.S. PATENT DOCUMENTS 6,076,080 A 6/2000 Morscheck et al.
6,915,252 B1 * 7/2005 Li ........................... G06F 17/50
703/1

(Continued)

OTHER PUBLICATIONS

Mohan_2013 (Decision Trees: A comparision of various algorithms for building decision trees).*

(Continued)

*Primary Examiner* — Brian S Cook
(74) *Attorney, Agent, or Firm* — Duft & Bornsen, PC

(57) ABSTRACT

Systems and methods are provided for composite part design. One embodiment is a method of creating a library of sublaminates used in optimizing fiber orientations of a multi-layer composite part subdivided along its depth into panels that each comprise a fraction of the area of the composite part. The method includes creating sublaminates that each comprise consecutively stacked layers having a unique sequence of fiber orientations, checking the sublaminates for compliance with stacking sequence rules that constrain how fiber orientations are sequenced, and removing sublaminates that do not comply with the stacking sequence rules. The method further includes generating new sublaminates that each include an additional layer, by, for each of multiple fiber orientations: selecting a sublaminate that was not remove, and generating a new sublaminate by appending an additional layer having the fiber orientation to the selected sublaminate.

24 Claims, 18 Drawing Sheets

(51) Int. Cl.
- *B64C 3/20* (2006.01)
- *B64C 1/12* (2006.01)
- *B64C 3/26* (2006.01)
- *B64C 1/00* (2006.01)

(52) U.S. Cl.
CPC .................. *B64C 3/20* (2013.01); *B64C 3/26* (2013.01); *B64C 2001/0072* (2013.01); *G05B 2219/35012* (2013.01); *G06F 2217/12* (2013.01); *G06F 2217/44* (2013.01); *G06F 2217/46* (2013.01); *Y02P 90/265* (2015.11); *Y02T 90/50* (2018.05)

(58) Field of Classification Search
USPC ............................................................ 703/1
See application file for complete search history.

(56) References Cited

U.S. PATENT DOCUMENTS

| | | | |
|---|---|---|---|
| 2005/0163975 A1* | 7/2005 | Chen | B29C 70/30 428/192 |
| 2009/0199948 A1 | 8/2009 | Kisch et al. | |
| 2011/0004451 A1* | 1/2011 | Krog | B29C 70/202 703/2 |
| 2012/0312589 A1* | 12/2012 | Balcome | H05K 3/429 174/258 |
| 2014/0288893 A1 | 9/2014 | Blom et al. | |

OTHER PUBLICATIONS

U.S. Appl. No. 14/836,369, filed Aug. 26, 2015, Adriana W. Blom et al., 'Ply Blending and Stacking Sequence'.
Beckwith et al., Designing with Composites: Suggested "Best Practices" Rules, SAMPE Journal, vol. 45, No. 1, Jan./Feb. 2009.
Bruyneel et al., Stacking sequence optimization for constant stiffness laminates based on a continuous optimization approach, Structural & Multidisciplinary Optimization 46(6), 783-794, 2012.
Kennedy et al., A Regularized Discrete Laminate Parametrization Technique with Application to Wind-Box Design Optimization, 53rd AIAA/ASME/ASCE/AHS/ASC Structures, Structural Dynamics and Materials Conference Apr. 23-26, 2012, Honolulu, Hawaii.
Meddaikar et al., Blended Composite Optimization combining Stacking Sequence Tables and a Modified Shepard's Method, 11th World Congress on Structural and Multidisciplinary Optimization, Jun. 7-12, 2015, Sydney Australia.
U.S. Appl. No. 14/836,333, filed Aug. 26, 2015, Adriana W. Blom et al., 'Ply Blending and Stacking Sequence'.

\* cited by examiner

1100

| BLOCK GUIDE | | Sub1 | Sub2 | Sub3 | Sub4 | Sub5 |
|---|---|---|---|---|---|---|
| LAYER 1 | 45 | 45 | 45 | | 45 | 45 |
| LAYER 2 | 90 | 90 | 90 | | 90 | 90 |
| LAYER 3 | -45 | -45 | | -45 | -45 | |
| LAYER 4 | 0 | | 0 | 0 | | |
| LAYER 5 | 45 | 45 | | 45 | | |
| LAYER 6 | 90 | 90 | | 90 | | |
| LAYER 7 | -45 | -45 | -45 | | | -45 |
| LAYER 8 | 0 | 0 | 0 | 0 | 0 | 0 |

| | FIBER ANGLE | LAYER | PANEL | | | | | | |
|---|---|---|---|---|---|---|---|---|---|
| | | | A | B | C | D | E | F | |
| BLOCK | 45 | 1 | 1 | 1 | 1 | 1 | 1 | 1 | ~1402 |
| | -45 | 2 | 1 | 1 | 1 | 0 | 0 | 0 | ~1404 |
| | 0 | 3 | 0 | 1 | 0 | 0 | 1 | 0 | ~1406 |
| | 90 | 4 | 1 | 1 | 0 | 1 | 0 | 1 | ~1408 |
| | 0 | 5 | 0 | 0 | 1 | 1 | 1 | 1 | ~1410 |

1400

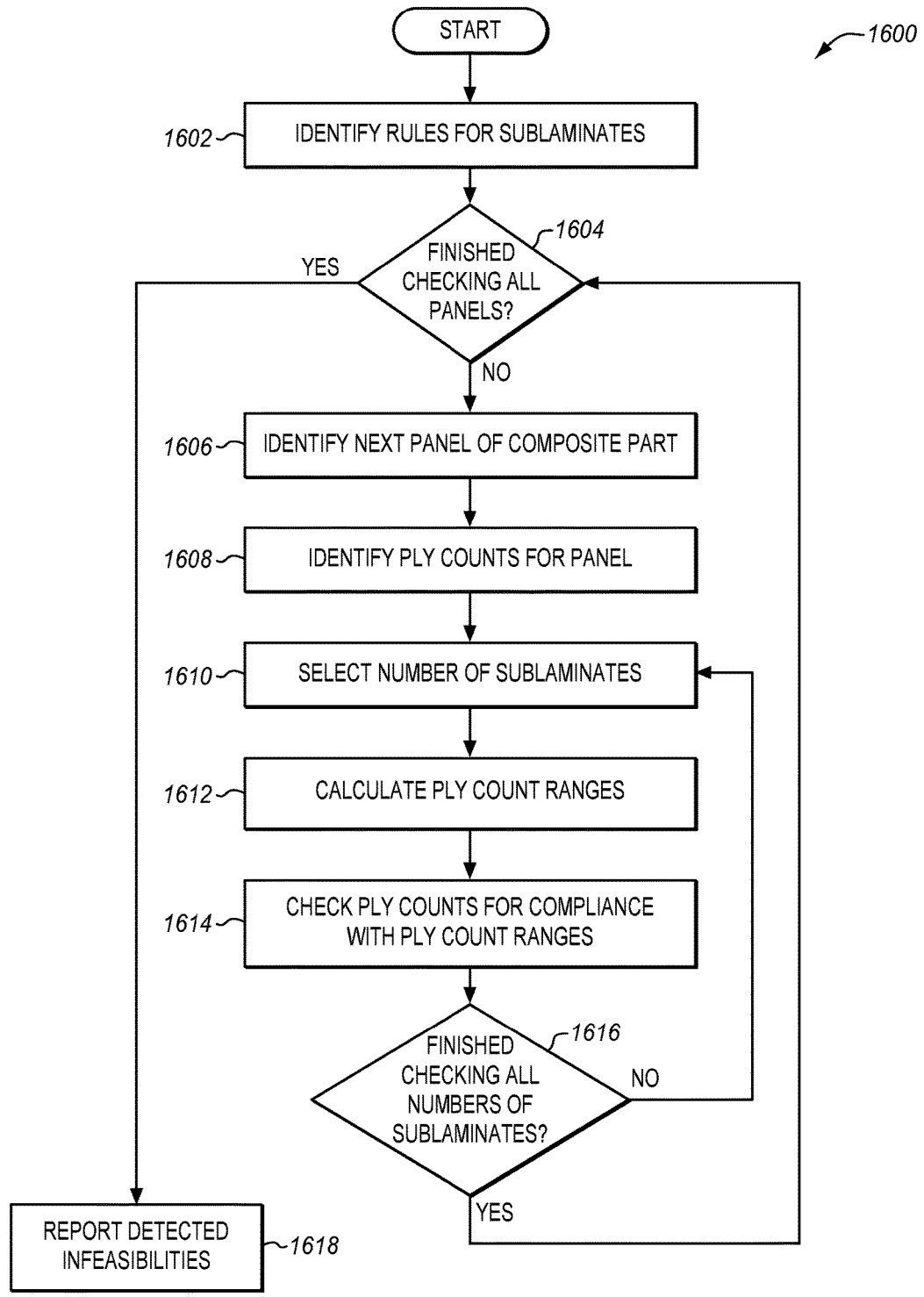

FIG. 17

N=3, PANEL 1 — 1700

| ORIENTATION | 0° | +45° | -45° | 90° | TOTAL |
|---|---|---|---|---|---|
| FIXED SURFACE PLIES | 2 | 2 | 2 | 2 | 8 |
| SUBLAMINATE MIN | 1 | 0 | 0 | 0 | 4 |
| MIN DUE TO RULES | 2 | 1 | 1 | 0 | N/A |
| SUBLAMINATE MAX | 3 | 3 | 3 | 2 | 10 |
| SUBLAMINATE RANGE | 1-3 | 1-3 | 1-3 | 0-2 | 4-10 |
| AVAILABLE RANGE | 5-11 | 5-11 | 5-11 | 2-8 | 20-38 |
| PANEL PLY COUNT REQ'MT | 10 | 10 | 10 | 10 | 40 |
| COMPATIBLE? | YES | YES | YES | NO | NO |

1712 { SUBLAMINATE MIN, MIN DUE TO RULES, SUBLAMINATE MAX }
1710 { SUBLAMINATE RANGE }
1720 { AVAILABLE RANGE }
1730 (NO)

FIG. 18

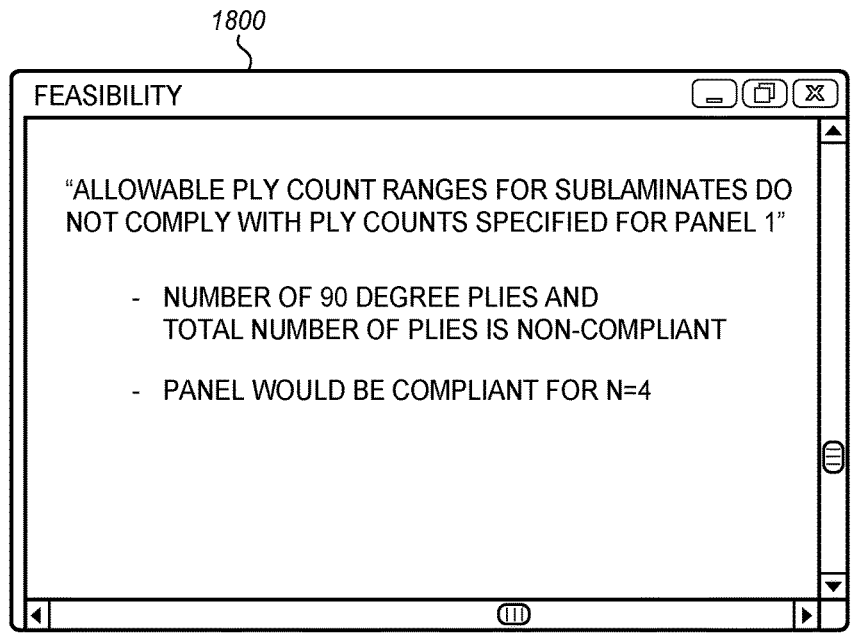

1800

FEASIBILITY

"ALLOWABLE PLY COUNT RANGES FOR SUBLAMINATES DO NOT COMPLY WITH PLY COUNTS SPECIFIED FOR PANEL 1"

- NUMBER OF 90 DEGREE PLIES AND TOTAL NUMBER OF PLIES IS NON-COMPLIANT

- PANEL WOULD BE COMPLIANT FOR N=4

SUBLAMINATE LIBRARY GENERATION FOR OPTIMIZATION OF MULTI-PANEL COMPOSITE PARTS

FIELD

The disclosure relates to the field of composite part construction, and in particular, to designing multi-layer composite parts.

BACKGROUND

Many composite parts (e.g., carbon fiber products, such as aircraft wings) are created as a series of vertically stacked plies which are bonded/cured together over time. In this manner, plies of constituent material are iteratively laid up and cured to consolidate into the composite part. To enhance the strength of a composite part with respect to stresses applied in different directions, each ply of constituent material within the composite part may include fibers that are oriented in a different direction than the fibers of neighboring plies. The combination of fiber orientations for the plies within the part dictates the strength of the part with respect to different kinds of stresses.

For complex parts that are divided into panels, the process becomes more complicated. For example, a design for the part may dictate complex and differing patterns of fiber orientations. These fiber orientations may even vary across multiple panels that together form the part. With complex parts that are intended to bear great stresses and are mission-critical (e.g., the wings of an aircraft), it remains a complicated process to ensure that desired strength is provided. Thus, current techniques for designing composite parts focus on ensuring part strength, and do not address manufacturing efficiency for a given part.

SUMMARY

Embodiments described herein enable the rapid creation of libraries of multi-layer sublaminates for composite parts. Each sublaminate has a unique sequence of fiber orientations. These libraries may be generated by use of an integer tree and checked for compliance with stacking sequence rules both during and after the generation of the tree. In this manner, a composite design system may rapidly identify and ignore families of sublaminates that do not comply with the stacking sequence rules.

One embodiment is a method of creating a library of sublaminates used in optimizing fiber orientations of a multi-layer composite part subdivided along its depth into panels that each comprise a fraction of the area of the composite part. The method includes creating sublaminates that each comprise consecutively stacked layers having a unique sequence of fiber orientations, checking the sublaminates for compliance with stacking sequence rules that constrain how fiber orientations are sequenced, and removing sublaminates that do not comply with the stacking sequence rules. The method further includes generating new sublaminates that each include an additional layer, by, for each of multiple fiber orientations: selecting a sublaminate that was not remove, and generating a new sublaminate by appending an additional layer having the fiber orientation to the selected sublaminate. The method further includes repeating the checking, the removing, and the generating until a maximum number of layers has been reached, and storing the sublaminates in memory as a library of available sublaminates for designing the composite part.

A further embodiment is a non-transitory computer readable medium embodying programmed instructions which, when executed by a processor, are operable for performing a method of creating a library of sublaminates used in optimizing fiber orientations of a multi-layer composite part subdivided along its depth into panels that each comprise a fraction of the area of the composite part. The method includes creating sublaminates that each comprise consecutively stacked layers having a unique sequence of fiber orientations, checking the sublaminates for compliance with stacking sequence rules that constrain how fiber orientations are sequenced, and removing sublaminates that do not comply with the stacking sequence rules. The method further includes generating new sublaminates that each include an additional layer, by, for each of multiple fiber orientations: selecting a sublaminate that was not removed, and generating a new sublaminate by appending an additional layer having the fiber orientation to the selected sublaminate. The method further includes repeating the checking, the removing, and the generating until a maximum number of layers has been reached, and storing the sublaminates in memory as a library of available sublaminates for designing the composite part.

A further embodiment is an apparatus that includes a memory that stores stacking sequence rules that constrain how fiber orientations are sequenced, and a controller that creates a library of sublaminates used in optimizing fiber orientations of a multi-layer composite part subdivided along its depth into panels that each comprise a fraction of the area of the composite part. The controller creates the library by creating sublaminates that each comprise consecutively stacked layers having a unique sequence of fiber orientations, checking the sublaminates for compliance with the stacking sequence rules, and removing sublaminates that do not comply with the stacking sequence rules. The controller further generates new sublaminates that each include an additional layer, by, for each of multiple fiber orientations: selecting a sublaminate that was not removed, and generating a new sublaminate by appending an additional layer having the fiber orientation to the selected sublaminate. The controller repeats the checking, the removing, and the generating until a maximum number of layers has been reached, and stores the sublaminates in the memory as a library of available sublaminates for designing the composite part.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 16 is a flowchart illustrating a method for analyzing the feasibility of a set of rules prior to engaging in optimization in an exemplary embodiment.

FIG. 17 is a table illustrating a comparison of ply count ranges to ply counts for a panel of a composite part in an exemplary embodiment.

FIG. 18 illustrates a report presented via a display for indicating detected compliance issues to a user.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
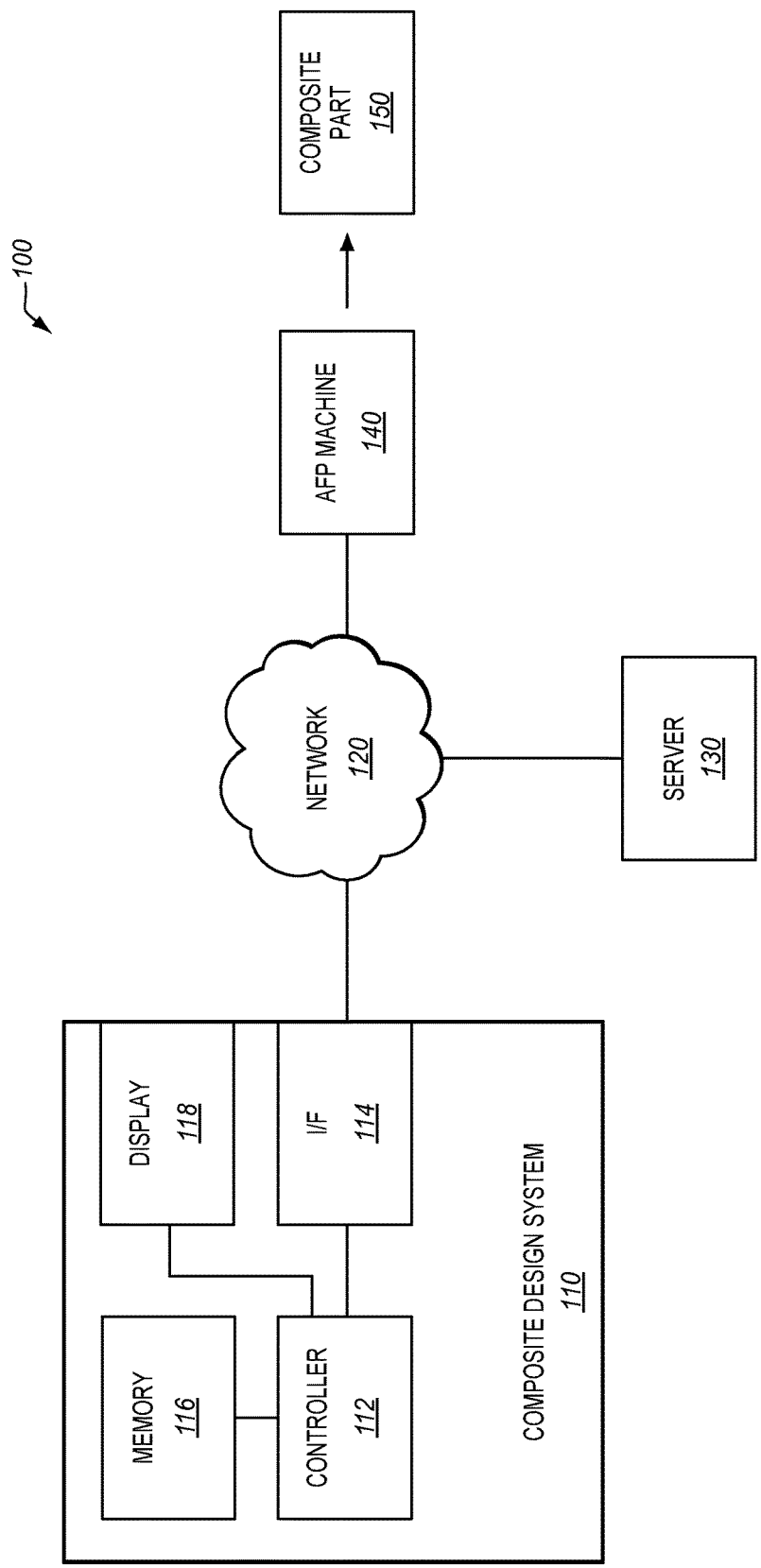
FIG. 1 is a block diagram of a composite manufacturing environment in an exemplary embodiment.

FIG. 1 is a block diagram of a composite manufacturing environment 100 in an exemplary embodiment. According to FIG. 1, environment 100 includes composite design system 110, which is capable of designing a composite part 150. Composite design system 110 optimizes part 150 to conform with stacking sequence rules that ensure part 150 has desired strength. Composite design system 110 also ensures that part 150 is capable of being manufactured efficiently by AFP machine 140.

In this embodiment, composite design system 110 includes controller 112, interface (I/F) 114, memory 116, and display 118 (e.g., a screen for presenting stored information). Controller 112 utilizes I/F 114 to access rules constraining how part 150 may be constructed, information describing the geometry of part 150, and/or other information. I/F 114 may acquire this information from server 130 via network 120. Controller 112 also generates designs for part 150, optimizing the designs to ensure that they will more efficiently utilize the time of AFP machine 140. These designs may be stored by controller 112 within memory 116. Controller 112 may be implemented, for example, as custom circuitry, as a processor executing programmed instructions, or some combination thereof. I/F 114 comprises any suitable combination of circuitry and/or components for transmitting data (e.g., via network 120). Memory 116 comprises any suitable data storage device such as a hard disk, flash memory, etc.

Further details of the operation of composite design system 110 will be described with regard to FIG. 5 below. However, FIGS. 2-4 are discussed before FIG. 5 in order to provide context illustrating an exemplary composite part that may be designed by system 110.

Figure 2:
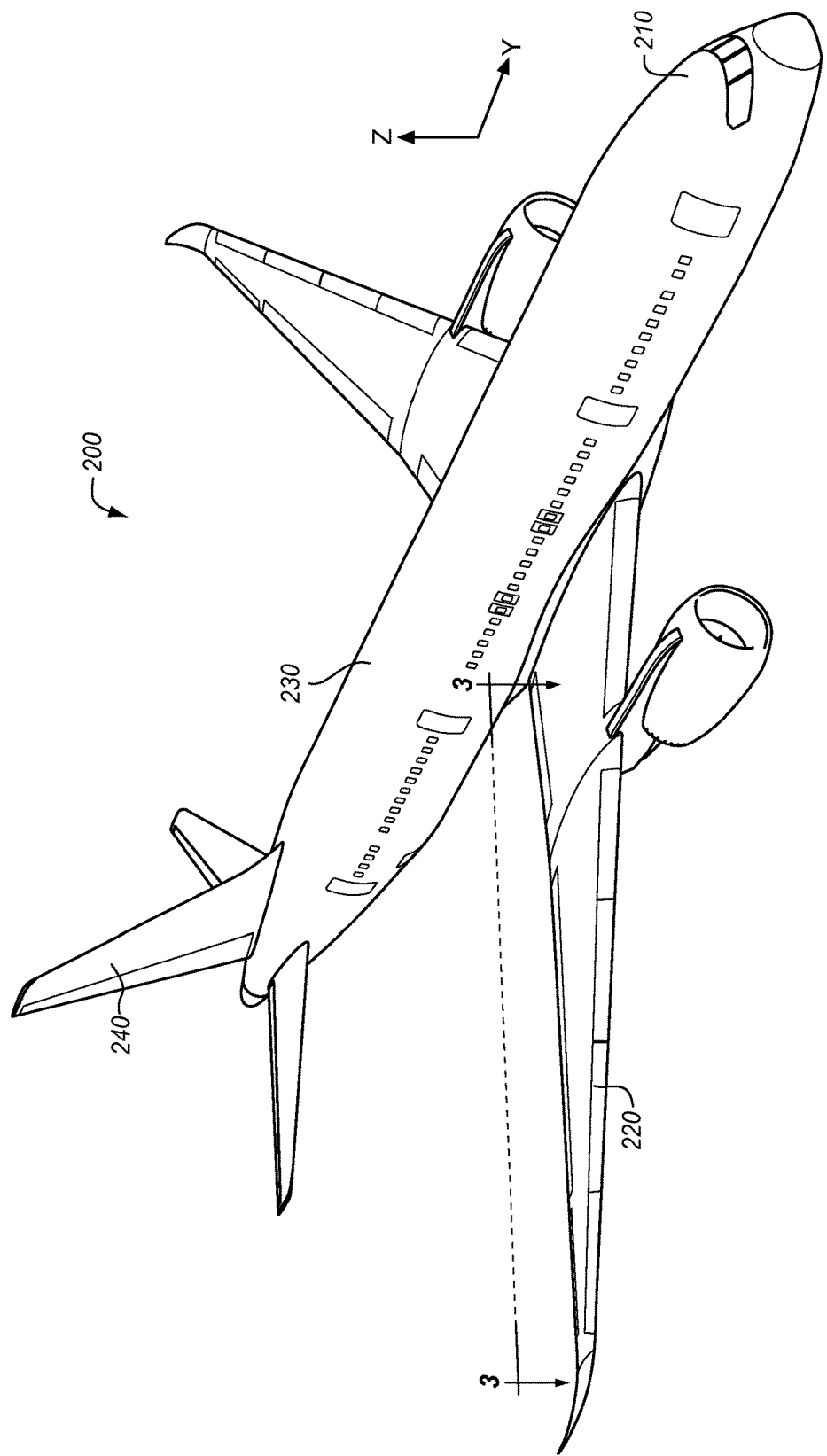
FIG. 2 is a diagram of an aircraft in an exemplary embodiment.

FIG. 2 is a diagram of an aircraft 200 in an exemplary embodiment. Aircraft 200 includes nose 210, wing 220, fuselage 230, and tail 240. Further discussion of aircraft 200 will focus on a multi-panel, multi-layer composite part for wing 220. However, similar techniques to those described herein may be applied to any suitable composite part.

Figure 3:
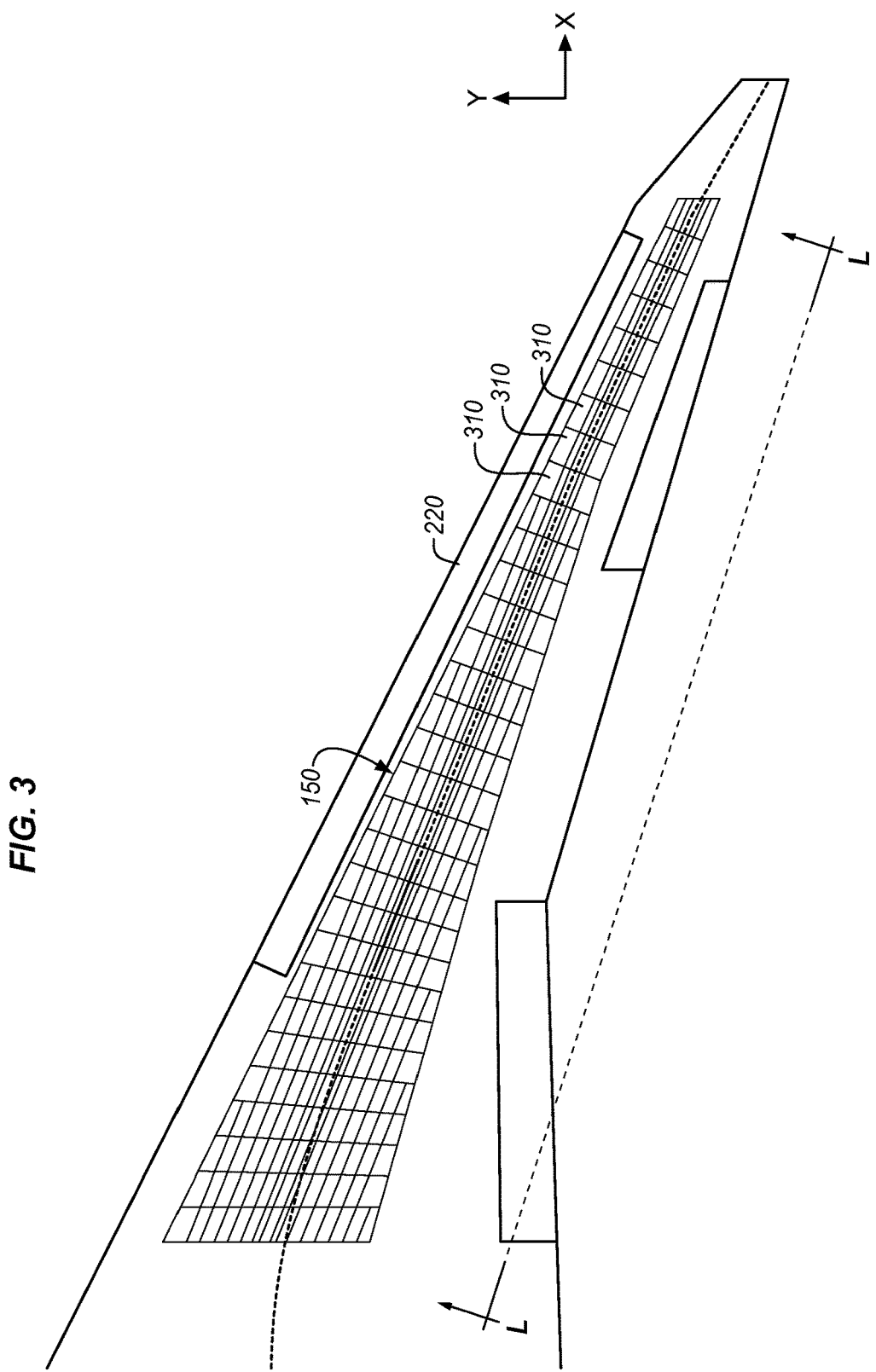
FIG. 3 is a diagram of a wing of an aircraft that includes a composite part divided into panels in an exemplary embodiment.

FIG. 3 is a diagram of a wing 220 of an aircraft that includes a composite part 150 divided into panels 310 in an exemplary embodiment. Specifically, composite part 150 comprises a portion of an upper wing skin. The view for FIG. 3 is shown by view arrows 3 of FIG. 2. As shown in this diagram, each panel 310 comprises a small portion of the area of part 150. View arrows L along FIG. 3 indicate a possible view along the length of wing 220.

Figure 4:
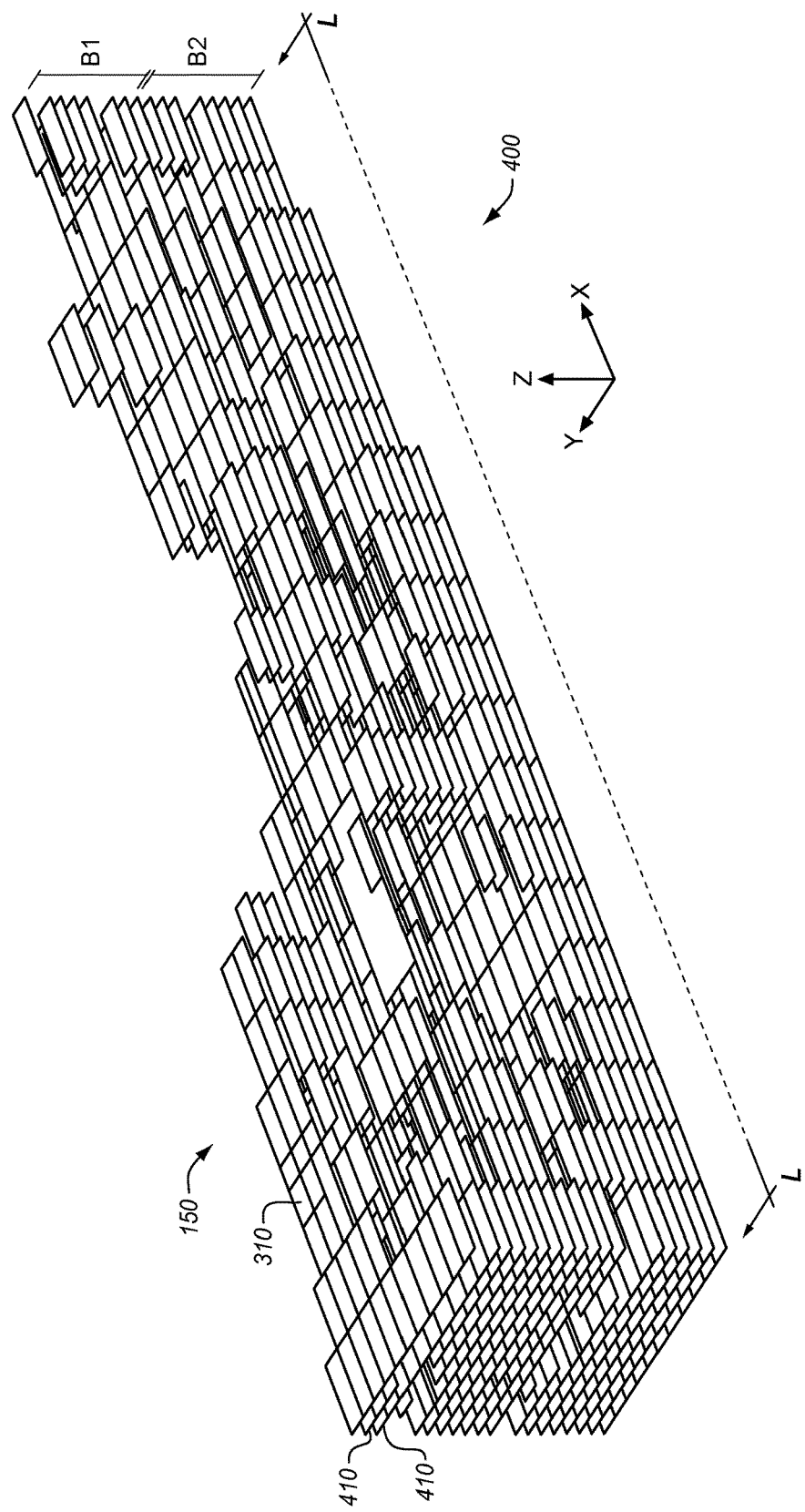
FIG. 4 is a diagram of a design for a portion of a part that includes multiple layers divided into panels in an exemplary embodiment.

FIG. 4 is a diagram of a design 400 for a portion of part 150 that includes multiple layers 410 divided into panels 310 in an exemplary embodiment. FIG. 4 includes arrows for view L shown in FIG. 3, in order to indicate how FIG. 4 aligns with FIG. 3. FIG. 4 illustrates that part 150 includes multiple layers 410. A layer 410 indicates which panels in design 400 will be laid up at the same fiber orientation by AFP machine 140 onto part 150, before AFP machine 140 proceeds to lay up the next layer. The next layer may either have a different fiber orientation or have plies that cover one or more panels already covered in the previous layer. A layer may therefore designate each of the plies that are laid by AFP machine 140 onto part 150, before part 150 undergoes curing to consolidate the plies onto part 150. As used herein, the combination of plies that are physically laid for a single layer is referred to as a "ply sequence," while a contiguous combination of plies within a single layer is referred to as a "ply shape." A ply sequence may, for example, include one ply shape or multiple ply shapes. FIG. 4 also illustrates that each layer 410 is divided into panels 310. Each panel 310 of each layer 410 may or may not be laid up with a ply, depending on the chosen design.

A number of specific stacking sequence rules/guidelines may be used to dictate how fibers are oriented across the layers of part 150 in order to ensure that part 150 exhibits a desired strength and is capable of enduring stresses applied during its lifetime. These may be referred to as "stacking sequence rules." In FIG. 4, design 400 divides part 150 along its depth (here, direction Z) into blocks (B1, B2). Each block comprises a set of contiguous layers within part 150. By dividing part 150 into blocks, ply sequences may be optimized on a block-by-block basis to comply with the stacking sequence rules. Optimizing on a block-by-block basis helps to ensure that optimization processes for a composite part can be completed in a reasonable amount of time.

Illustrative details of the operation of composite design system 110 will now be discussed with regard to FIG. 5. Assume, for this embodiment, that a new design for composite part 150 is being created by composite design system 110, and that the new design shall comply with the stacking sequence rules in order to ensure that part 150 has adequate strength. At the same time, system 110 will optimize the new design for manufacturability to ensure that time at AFP machine 140 is more efficiently utilized.

Figure 5:
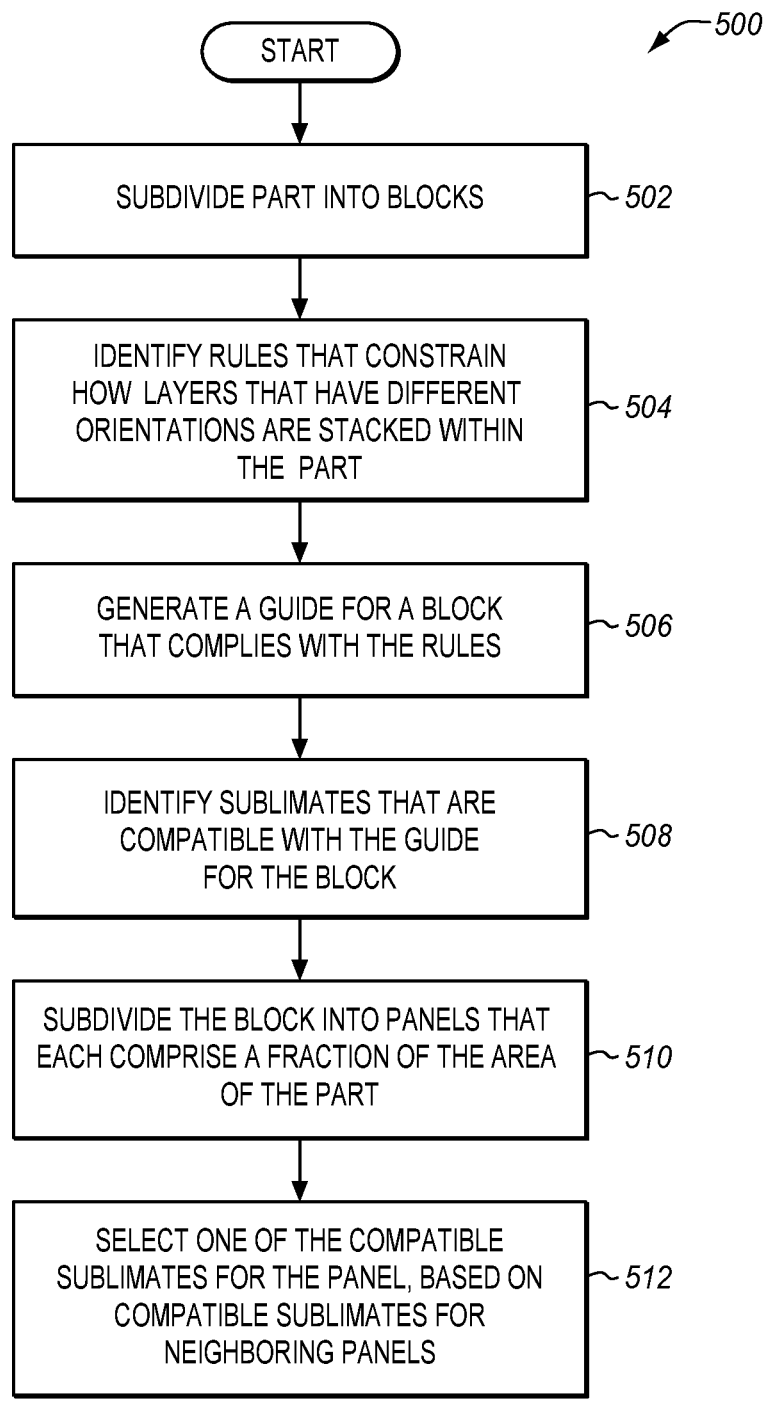
FIG. 5 is a flowchart illustrating a method for operating a composite design system in an exemplary embodiment.

FIG. 5 is a flowchart illustrating a method 500 for designing a multi-layer composite part 150 in an exemplary embodiment. The steps of method 500 are described with reference to composite design system 110 of FIG. 1, but those skilled in the art will appreciate that method 500 may be performed in other systems. The steps of the flowcharts described herein are not all inclusive and may include other steps not shown. The steps described herein may also be performed in an alternative order.

Controller 112 initiates by receiving input via I/F 114 indicating a geometry of a multi-layer part (part 150). This information may indicate which panels are adjacent/neighboring within part 150, and may further include an expected number of plies for each different fiber orientation to be laid at each panel (e.g., a final depth/thickness and composition of each completed panel in part 150). In a complex design, part 150 exhibits a changing thickness along its length such that some panels will include more plies than other panels. The geometry information may further include information subdividing part 150 along its depth into layers and/or blocks. According to FIG. 5, in step 502 controller 112 subdivides part 150 into blocks (e.g., blocks B1-B2). Each block comprises a contiguous subset/stack of the layers of part 150. This subdividing of part 150 into blocks allows part 150 to be optimized on a block-by-block basis by controller 112.

In step 504, controller 112 identifies stacking sequence rules that constrain how layers that have different fiber orientations are stacked within part 150. In one embodiment, the rules define four allowable fiber orientations for a layer (0°, 45°, −45°, and 90°), the rules dictate that no more than four adjacent layers may have the same fiber orientation, the rules require that each block include at least one layer of each orientation, etc. Systematic evaluation of these rules in an optimization environment is complicated by the fact that plies may be selectively omitted from panels within a given layer.

In step 506, controller 112 generates a guide (i.e., an arrangement of fiber orientations for a block) that complies with the rules. The guide prescribes a fiber orientation for each layer of the block. The guide may be generated by reference to the stacking sequence rules discussed above.

In step 508, compatible "sublaminates" are identified for the generated guide. A sublaminate is a set of consecutive ply sequences for the block, and may be assigned on a panel-by-panel basis. Compatible sublaminates are subsets of the layers in the guide for the block. Layers indicated in a guide may be omitted from a sublaminate, but the sequence indicated in the guide must be maintained in order for the sublaminate to be compatible. The sublaminates also are chosen to ensure that they are individually compatible with the stacking sequence rules. Moreover, the set of sublaminates may be further reduced to ensure that any combination of sublaminates through the thickness also comply with the stacking sequence rules. The guides and compatible sublaminates may be pre-calculated by controller 112 and filtered to ensure compliance with the rules, thereby ensuring that part 150 has a desired strength.

However, while any of these sublaminates may be chosen to provide desired strength for part 150, it remains a problem to determine what sublaminates will enhance manufacturability. To this end, controller 112 subdivides the part into panels that each comprise a fraction of the area of part 150 in step 510.

Controller 112 further selects a compatible sublaminate for each panel in each block, based on the compatible sublaminates for neighboring panels in step 512. For example, controller 112 may select a compatible sublaminate for a panel with the objective of increasing the number of contiguous plies laid by an AFP machine in a ply sequence. This technique may therefore reduce the amount of time taken by the AFP machine while laying-up ply sequences for the layers of the block.

Once compatible sublaminates are chosen for each panel in each block, the design is completed. Therefore, controller 112 may configure memory 116 to store the design for use by AFP machine 140 when constructing part 150.

Utilizing method 500 above, the ply shapes and/or sequences for individual layers may be chosen in order to facilitate the speed of manufacturing/lay-up for each block. This in turn ensures that complex parts utilize designs that reduce their overall cost and/or time of manufacture. Further details of the optimization techniques used herein are described with respect to the examples section below.

EXAMPLES

In the following examples, additional processes, systems, and methods are described in the context of a composite design system 110 that reduces layup time for a composite part. The system 110 optimizes ply sequences while also ensuring that stacking sequence rules are met.

For many AFP processes a substantial amount of time is spent laying up plies of fiber (this is called "in-cycle time"). However, the rest of the time consists of machine down time (e.g., cleaning the machine, replacing cutters, fixing broken tows, etc.), inspection for each layer, and rework of fibers that have already been laid up. Thus, designs which reduce in-cycle and/or out-of-cycle time for an AFP machine 140 enhance the overall speed of production for a composite part. The following exemplary optimization metrics are examples of metrics that may be used (alone or in combination) to ensure that ply sequences for the layers of a composite part are chosen in such a manner as to increase manufacturing speed of a layer, block, or entire composite part. The exemplary metrics provided below are illustrative, and different metrics may be utilized as desired in operating environments.

FIGS. 6-9 illustrate exemplary optimization metrics used to ensure that ply shapes are chosen which reduce the overall speed of laying-up a composite part (e.g., via an AFP machine). In the following discussion, the term "course" refers to a band of material laid down by an AFP or automated tape laying machine along a specified curve that follows the desired fiber orientation on the surface. The band of material may consist of one or more strips of material.

These strips may be dispensed and cut independently. Plies are formed by sequentially laying one or multiple courses that fill up the area within the ply boundaries. Depending on the direction the AFP head moves strips are started or stopped at a ply boundary. Starting a strip is called an "add", while stopping a strip is called a "cut". If a course is parallel to the ply boundary, part of the ply boundary may be formed by the outer edge of the outermost strip of a course.

Optimization Metric 1—Total Boundary

Figure 6:
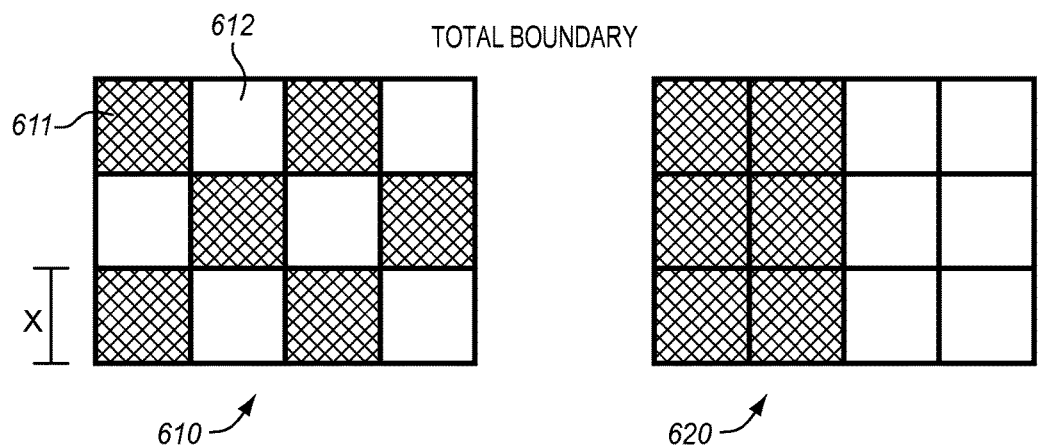
FIGS. 6-9 illustrate exemplary optimization metrics for ply sequences in an exemplary embodiment.

FIG. 6 illustrates two different ply sequences (610, 620) for a four panel long, three panel wide layer of a composite part. Each panel is square, and has a length of X. As shown in FIG. 6, shaded panels 611 are filled with a ply, while unshaded panels 612 are not filled with a ply. Since the panels that are filled with a ply are not contiguous, the total boundary length of ply sequence 610 is equal to (4 sides per panel)*(6 panels)=24X. In contrast, the total boundary length of ply sequence 620 is equal to 8X. Since some AFP machines slow down when making a cut to a ply, and since the total border length of a ply shape and/or sequence is strongly correlated with the number of cuts made by an AFP machine, optimizing a layer based on ply shape enhances manufacturing speed. The time to manufacture ply sequence 620 is therefore shorter than for ply shape 610, at least because ply sequence 610 exhibits more cuts and adds, which is likely to cause more AFP machine down time. Furthermore, since ply shape 610 exhibits more cuts, more time will be spent by an operator inspecting the ply sequence, and there will be a greater likelihood that an edge will need rework (since there is more overall edge length).

Furthermore, ply shapes with a shorter total boundary are more likely to use long courses. Using longer courses instead of shorter courses ensures less idle time at an AFP machine, as the machine travels through the air from one course to the next. Longer courses also result in faster tape-laying because the AFP machine can reach its maximum speed while laying a course, since it takes time to get up to maximum speed. Thus, the total boundary length of a ply sequence stands as a good indicator for the manufacturing efficiency of that ply sequence.

Optimization Metric 2—Cut Boundary

Figure 7:
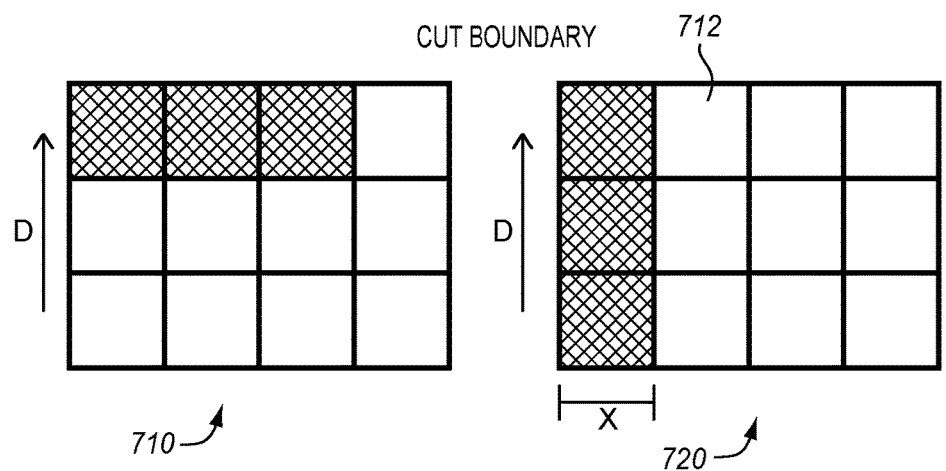

FIG. 7 illustrates two different ply sequences (710, 720) for a four panel long, three panel wide layer of a composite part. Each panel is square, and has a length on its side of X. As shown in FIG. 7, shaded panels 711 are filled with a ply, while unshaded panels 712 are not filled with a ply. FIG. 7 further illustrates a direction (D) in which the AFP machine will be oriented when laying down plies for this layer. Furthermore, in this embodiment, each course is exactly one panel wide. It can quickly be understood that only one course of the AFP machine is used to create ply sequence 720, while three courses are used to create ply sequence 710. Thus, ply sequence 710 may require the AFP machine to cut, stop, and reposition two more times than ply sequence 720. An increased number of cuts and courses also increases the chances of machine error when laying-up a ply sequence, as well as increasing the overall inspection and rework time for that ply sequence. Inspection generally takes place at the location of each cut and add on a composite part, as well as in-between individual courses. Thus using fewer courses to generate a ply sequence increases the manufacturing rate of the composite part. As used herein, any boundaries where courses are cut or added are referred to as "cut boundaries."

Optimization Metric 3—Internal Corners

Figure 8:
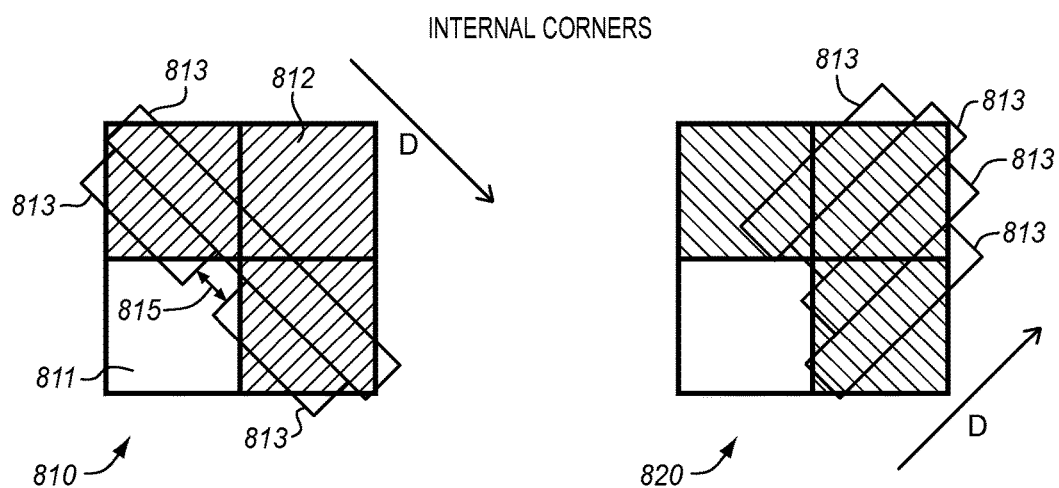

FIG. 8 illustrates two different ply sequences (810, 820) that each comprise plies 812 laid up for a layer of a composite part. As shown in FIG. 8, shaded panels 812 are filled with a ply, while unshaded panels 811 are not filled with a ply. FIG. 8 further illustrates that for ply sequence 810, an extra cut 815 must be made in order to bridge a gap between panels, owing to AFP machine orientation D. In contrast, in ply sequence 820, the orientation (D) of the AFP machine allows for courses to be laid up in a single course without needing to stop and restart the AFP machine. As used herein, corners within a ply shape that require an AFP machine to stop, cut, and then resume (e.g., to lay multiple collinear courses in a single course) are referred to as internal corners. Internal corners occur if the fiber orientation of a layer is not aligned with the boundaries of the ply sequence for that layer. Optimizing ply sequences to reduce the number of internal corners reduces number of stops and restarts of an AFP machine during a single run/pass. Internal corners may be identified, for example, based on a known orientation of fiber within the layer being laid up.

Optimization Metric 4—Number of Courses

Figure 9:
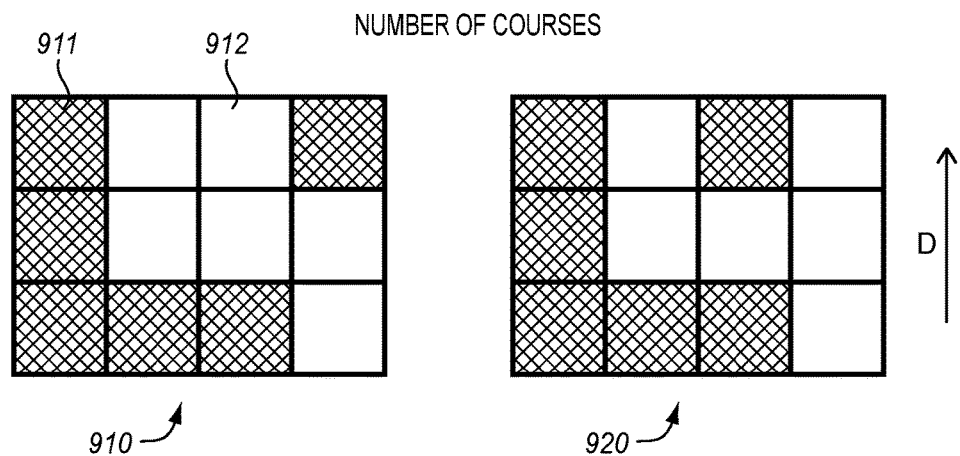

FIG. 9 illustrates two different ply sequences (910, 920) for a four panel long, three panel wide layer of a composite part. Each panel is square, and has a length on its side of X. As shown in FIG. 9, shaded panels 911 are filled with a ply, while unshaded panels 912 are not filled with a ply. FIG. 9 further illustrates a direction (D) in which the AFP machine will be oriented when laying down plies. This may, for example, be the same orientation as the fiber orientation used for plies laid up by the AFP machine. FIG. 9 illustrates that even when there are the same number of filled panels in a ply sequence, with the same size border, the speed of laying up that ply sequence can vary depending on the ply shapes and relative positions chosen. In this example, ply sequence 920 is more manufacturing efficient since it only uses three one-panel wide courses, while ply sequence 910 uses four courses. Laying-up multiple plies with fewer courses also reduces off-part motion at an AFP machine, which increases manufacturing speed.

Optimization Metric 5—Average Course Length

An AFP machine will not reach its maximum lay-up speed if a course is too short. This means that shorter courses result in longer lay-up times. Hence, it may be desirable to calculate average course length, (e.g., defined as ply sequence area divided by the number of courses within the ply shape) when optimizing ply shapes. The average course length for the entire part can be calculated by dividing the total area for all ply sequences by the total number of courses.

Exemplary Stacking Sequence Rules

Stacking sequence rules may constrain how a ply sequence is designed for a layer. Table 1 below illustrates an exemplary set of stacking sequence rules that may be utilized when designing a composite part.

TABLE 1

Stacking Sequence Rules

| Rule | Description |
| --- | --- |
| A | Employ balance and symmetry across the layers of the composite part |
| B | Do not stack more than a threshold number of adjacent layers having the same fiber orientation. |
| C | Use at least one layer of each fiber orientation within the composite part |
| D | Add 45° layers in pairs of +45° and −45° |
| E | Minimize the difference in fiber orientation angle between different plies |

In this example, some rules may be flagged as mandatory for consideration of controller 112 (e.g., no violations are allowed), while other rules may be flagged as guidelines that may be violated under certain circumstances (e.g., at locations that are closer to the mid-plane of the composite part). In this example the rules are specific to laminates that consist of 0°, 90° and ±45° plies. Other rules may apply to laminates that contain plies with different fiber orientations. The presented method is not restricted to four fiber orientations.

Composite Part Guides

Figure 10:
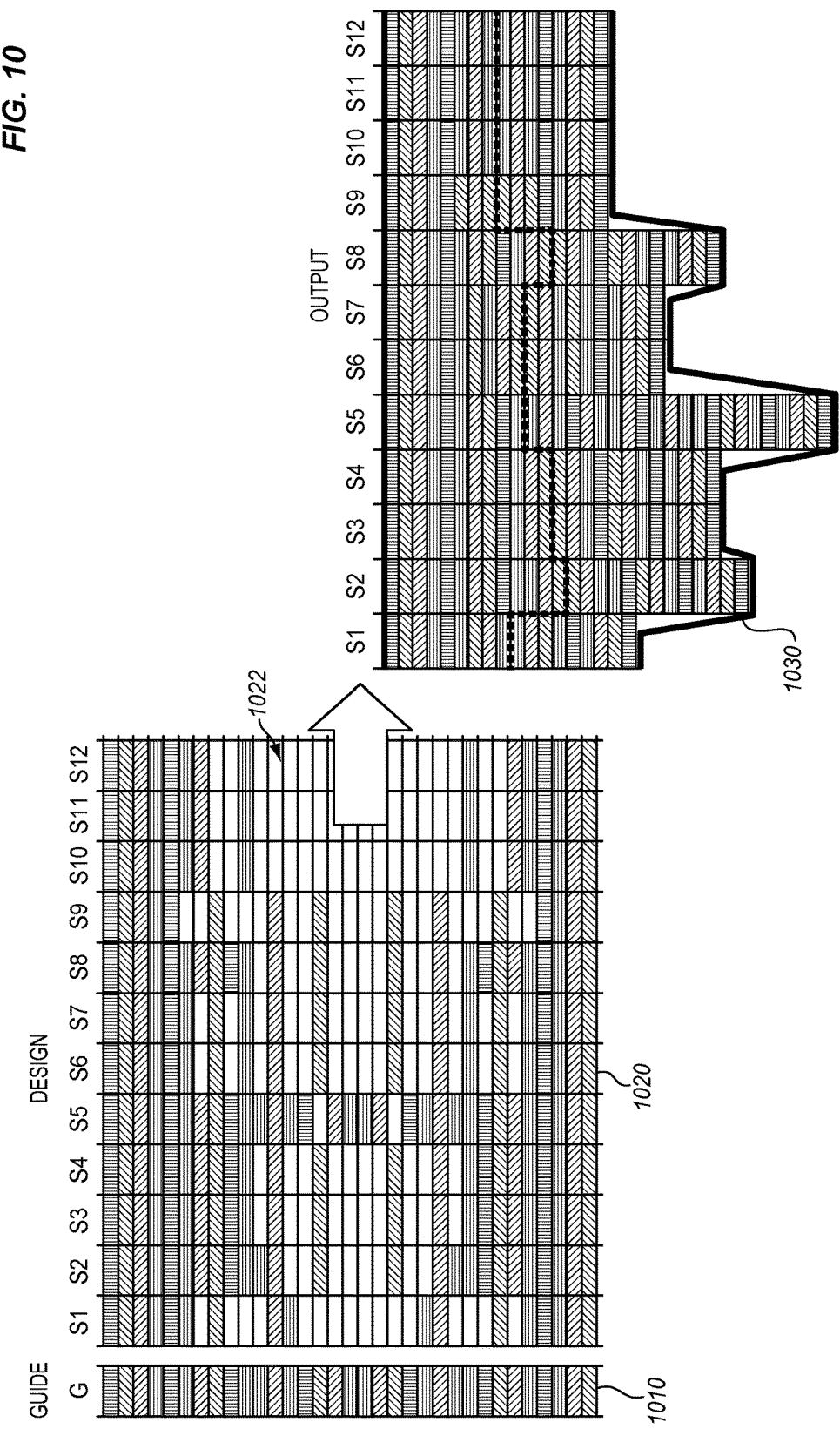
FIG. 10 is a diagram illustrating a relationship between a design for a composite part, and an output resulting in the composite part.

When designing a composite part, a guide may be constructed to indicate the fiber orientation that will be used for each layer/ply sequence. Controller 112 may then selectively elect to include plies within the design based on the guide, on a layer-by-layer and panel-by-panel basis. The design actually chosen for a part may include gaps (in the tabular representation of a part design) where a ply is not laid for a given layer defined by the guide. However, when plies are applied by an AFP machine onto the composite part, the plies that are separated by a gap in the design will be directly laid atop each other. This means that the plies laid for a given layer are not necessarily coplanar when laid up on the composite part. That is, as shown in FIG. 10, when a guide 1010 is used to create a design 1020 for a composite part comprising panels S1-S12, and design 1020 includes one or more empty portions 1022 within its layers. The actual laid-up output 1030 for the product is condensed such that ply sequences separated across the thickness by empty panels in design 1020 will be placed adjacent to each other in output 1030. A mid-plane of output 1030 is shown as a dotted line on a panel by panel basis for FIG. 10.

Sublaminates

Figures 11, 12:
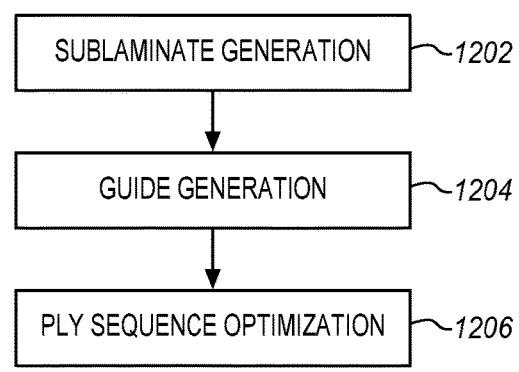
FIG. 11 is a chart illustrating sublaminates that are compatible with a block of a composite part in an exemplary embodiment.
FIG. 12 is a flowchart illustrating additional steps implemented for operating a composite design system in an exemplary embodiment.

Sublaminates may be chosen based upon a guide for a corresponding block (i.e., a template dictating a fiber orientation for each layer of the composite part). Thus, if a guide for a block includes eight ply sequences that each have a predefined fiber orientation, a sublaminate includes up to eight ply sequences for an ordered subset of those fiber orientations. In embodiments where a guide is used, not all ply sequences from the guide need to be present in the panel sublaminate. However, all plies in the sublaminate should at least be present in the guide for the block and in the correct order to fit. In this example, two sublaminates are compatible if they could both be used in a block without violating the guide for that block. To illustrate this concept, diagram 1100 of FIG. 11 shows that sublaminates 1-5 (sub1-5) are capable of being placed in the same guide for the block. An empty cell in a row indicates that no material is placed for that panel for that layer. For example, sublaminate "Sub1" could be written as [45/90/-45/45/90/-45/0], while sublaminate "Sub2" could be written as [45/90/0/-45/0]. "Sub1" is compatible with "Sub2," because "Sub1" can be generated by omitting layer 4 from the guide block laminate, i.e. [45/90/-45/0/45/90/45/0], while "Sub 2" may be generated by omitting layers 3, 5 and 6. Sublaminates are not compatible if they cannot both be inserted into a block without violating the fiber orientations required for the layers of that block. For example, a sublaminate with fiber orientations [45/0/0/45] would not be compatible with the guide depicted in FIG. 11, because there is only one 0° layer between layers 1 and 5, and there is no 45° layer after layer 8.

Optimization Model

The optimization model used by controller 112 involves three steps as shown in FIG. 12. The first step involves generating sublaminates in step 1202. Hence, ply sequences that are compatible with each block should be determined. Once a library of compatible sublaminates has been generated, guides may be generated for the blocks in step 1204. Using a guide for the block, ply sequences may be optimized in step 1206.

The objective of sublaminate generation is to create a library of sublaminates with feasible stacking sequences in a pre-processing step and to exclude infeasible regions of the design space before optimization is performed. This step helps to shrink the size of the solution space that will be searched during optimization. To illustrate this concept, if four fiber orientations are allowed for each of ten layers in a sublaminate, there will be $4^{10}$ (i.e., 1,048,576) possible stacking sequences if each layer includes a ply. The number of options increases to $5^{10}$ (i.e., 9,765,625) if empty panels are allowed within a layer. Hence, it remains beneficial to reduce the number of potential sublaminates a priori in order to ensure that the optimization process converges in a reasonable amount of time. Table 2 shows exemplary criteria for ten layer sublaminates generated in this manner. These criteria may be developed based on a prior calculated fiber orientation distribution for the part. These criteria may also change based on the overall fiber orientation distribution expected for the part. If distribution drastically changes from panel to panel, multiple libraries of sublaminates may be used (e.g., different libraries that each serve panels having different characteristics).

TABLE 2

Exemplary Criteria for Sublaminates

Each sublaminate includes at least four and at most ten ply sequences
Each sublaminate always starts and ends with a 0° fiber orientation ply sequence
The number of ply sequences having a 90° fiber orientation within the sublaminate is less than two
The number of ply sequences having a 0° fiber orientation is less than four
The number of ply sequences having a 45° fiber orientation and the number of ply sequences having a −45° fiber orientation is the same, and 45° fiber orientations alternate with −45° fiber orientations
Either a 45° or a −45° fiber orientation will be used for the ply sequence placed after the first ply sequence having a 0° fiber orientation and before the last ply sequence having a 0° fiber orientation
The same fiber orientation will not be used on more than four consecutive ply sequences
If the same fiber orientation is repeated twice or three times in consecutive ply sequences, the ply sequences that come before and after those ply sequences are not permitted to be orthogonal to the consecutive ply sequences Using the above technique, stacking sequence rules may be complied with, even when different sublaminates are stacked on top of each other in the composite part.

Block and Guide Generation

Although stacking sequence rules should ideally be satisfied in each panel rather than each block, generating a guide that satisfies the stacking sequence rules reduces the number of stacking sequence rule violations in individual panels. In some cases, it may also be impossible to satisfy all stacking sequence rules for all panels within the composite part. In general, if a violation of the stacking sequence rules is required, it is allowed near the mid-plane of the composite part. It remains desirable to distinguish between inner blocks that are closest to the laminate mid-plane, and outer blocks that are closer to the laminate surface. In this example, outer blocks are required to satisfy the stacking sequence rules, including symmetry, while stacking sequence rules are allowed to be violated in the inner blocks. However, designs that use violating ply sequences in the inner blocks are discouraged via a penalty to the objective function during optimization.

The design may be subdivided by controller 112 into blocks based on input selecting a number of blocks, or based on input indicating a number of layers to include within each block. The size of each block is the same as the maximum number of ply sequences that could be chosen for the sublaminates in the previous step. For this example, each block defines ten layers. Having extra blocks improves the ability to optimize, but may also unnecessarily increase the number of ply sequences used for manufacturing, which reduces the overall manufacturing speed. In this example, all panels by definition use at least the outermost blocks of the part, and thus these blocks are not part of the optimization process. In this example, the controller further determines which blocks will be considered inner blocks where rule violations are allowed. If the number of inner blocks is too few, it may not be possible to find a feasible solution. If the number of inner blocks is too many, a solution may include an unnecessary number of stacking sequence violations. In this example, the number of inner blocks is even and is equally distributed around the mid-plane. Enforcing symmetry between blocks that are equidistant from the mid-plane helps to ensure that the rules are met and that the solution space is smaller. In the guide generation step, controller 112 may further assume that the inner blocks are symmetric about the mid-plane of the part, even though non-symmetry of the panel laminates in the inner blocks will be allowed later on when the design is chosen. A symmetric guide for the design improves the symmetry of the panel stacking sequences.

In this example, a binary decision variable $Y_{bs}$ is defined, which is 1 when sublaminate s is assigned to block b and 0 otherwise. Sublaminate s may be any sublaminate generated in the previous step which has the chosen number of ply sequences. As discussed above, blocks b only span half of the blocks defined in the problem due to symmetry. Integer optimization may be used to determine the guide design via the mathematical formulae below:

$$\text{Minimize } \Sigma_i \varepsilon_{bs} Y_{bs} \quad (1)$$

$$\text{Subject to } \Sigma_s Y_{bs} = 1 \forall b \quad (2)$$

$$\Sigma_s n_{sk} Y_{bs} \geq \max_i(n_{ik}) \forall k \quad (3)$$

The objective function (1) minimizes the total values assigned to each (b, s) combination. $\varepsilon_{bs}$ is a small random noise introduced to allow controlled permutations on the guide generation, such that the objective function finds a feasible solution, which may be controlled by changing the random number seed for $\varepsilon_{bs}$. The permutation $\varepsilon_{bs}$ may also be based on the solution from the ply optimization step to improve the solution by changing the guide rather than using a random permutation. Further and/or alternative algorithms may be utilized as desired, such as genetic algorithms.

Constraint (2) ensures that each block has only one sublaminate assigned. Constraint (3) ensures that the ply shape optimization based on the guide will have a feasible number of plies for each fiber orientation, by making sure the number of ply sequences with a given orientation in the solution is greater than the maximum number required for each panel. In this equation $n_{sk}$ represents the number of ply sequences with fiber orientation k in sublaminate s and $n_{jk}$ represents the number of plies with fiber orientation k in panel i.

With the blocks and guides defined for the composite part, controller 112 may proceed to optimization of ply sequences for the composite part in order to facilitate manufacturing.

Ply Shape Optimization

Figures 13, 14:
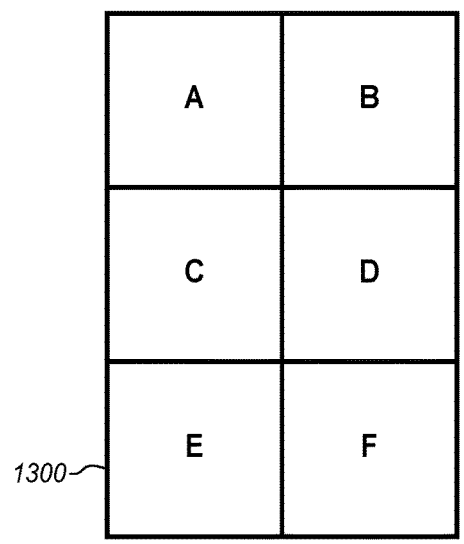
FIG. 13 illustrates a set of six adjacent panels of a composite part in an exemplary embodiment.
FIG. 14 illustrates an exemplary design for a block of a composite part comprising six adjacent panels in an exemplary embodiment.
Figure 15:
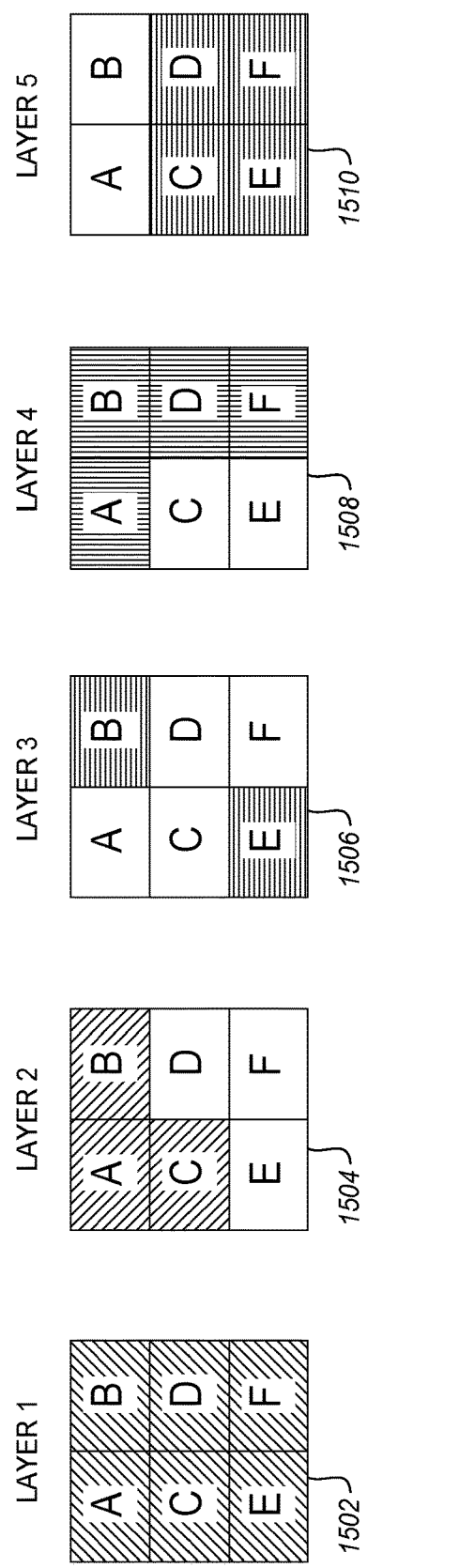
FIG. 15 illustrates ply shapes for each of multiple layers of the composite part of FIG. 12, based on the design of FIG. 13.

FIG. 13 illustrates a set 1300 of six adjacent panels (A, B, C, D, E, F) in an exemplary embodiment. FIG. 14 illustrates an exemplary design for a block (B) of a composite part comprising six adjacent panels in an exemplary embodiment. This design includes layers 1402, 1404, 1406, 1408, and 1410. For each layer, controller 112 determines which panels will be laid up with a ply of fiber. FIG. 15 illustrates ply sequences (1502, 1504, 1506, 1508, 1510) for each of multiple layers of the composite part of FIG. 13, based on the design of FIG. 14. For example, ply shape 1502 corresponds with layer 1402 of FIG. 14, ply shape 1504 corresponds with layer 1504 of FIG. 14, and so on.

The ply shape optimization process used by controller 112 ensures that the resulting ply sequences optimize manufacturability. In this example manufacturability is measured using the total ply boundary metrics. In this example, during optimization the designs for the inner blocks are chosen for individual layers of a panel. In contrast, for the outer blocks, the design is chosen by selecting a sublaminate from the library of feasible sublaminates created in the previous step that are compatible with the guide for each block.

To facilitate optimization, a binary decision matrix may be used to indicate whether or not to lay up a ply onto a panel in a given layer. In the matrix, this decision is indicated by binary decision variable $X_{ijk}$. This variable is 1 if the ply in panel i is present in ply sequence j, which has the fiber orientation represented by an orientation index k. Index i is defined for all panels in the problem and index j and k are defined for all individual ply sequences (as opposed to blocks) to ensure the objective function is calculated for the entire laminate and not just for the blocks used in the optimization. The orientation index k may have five values: one for each of four fiber orientations and a fifth value if no fiber will be laid up. Index k is listed with $X_{ij}$ for tracking purposes only, since the fiber orientation for sequence j is defined by the design. The guide for the design is represented by binary variables $Y_{jk}$, which are determined in the guide generation step. $Y_{jk}$ is 1 if ply sequence j has fiber orientation index k in the guide and 0 otherwise. During the optimization the decision variables $X_{ijk}$ for the inner blocks are changed directly, but for the outer blocks $X_{ijk}$ are determined by which sublaminate is picked. The choice of sublaminates is defined by binary decision variables $Z_{ibs}$, where $Z_{ibs}$ is 1 if panel i in block b is assigned with sublaminate s. Note that sublaminate s can only be picked from a library of sublaminates that are feasible and compatible with the guide for block b. For the calculation of the ply boundary length, a set of neighbors, $N=\{(i, i')|$ where i and i' are physically adjacent$\}$ is defined, which represents pairs of panels that are physically adjacent. The values of the Y variables described herein are not optimized at this point in time, because the Y values were assigned when the guide was determined in the previous step.

The following formulas may be used to optimize the design at this point in time, where four fiber orientations are allowed (0°, 45°, −45°, 90°.

$$\text{Maximize Subject to } \sum_{(i,i') \in N, j,k \in TL} w_{ii'} * X_{ijk} * X_{i'jk} - \sum_{j \in \text{inner blocks}} p * X_{ijk} \quad (4)$$

$$\sum_{j \in \text{InnerBlocks}} X_{ijk} + \sum_{j \notin \text{InnerBlock}} 2 * X_{ijk} = n_{ik} \quad (5)$$

$$\forall i, k \in [0, 45, -45, 90]$$

-continued $$\sum_s Z_{ibs} \leq 1 \quad \forall\, i, b \in OuterBlocks \quad (6)$$

$$\sum_i X_{ijk} \leq M * Y_{jk} \quad \forall\, j, k \in [0, 45, -45, 90] \quad (7)$$

$$X_{ijk} = \sum_s \alpha_{sk} Z_{i,b|j \in b, s} \quad \forall\, i, j \in OuterBlocks, k \quad (8)$$

$$Y_j + \sum_{ik \in [0,45,-45,90]} X_{ijk} \leq 0 \quad \forall\, j, k \in [0, 45, -45, 90] \quad (9a)$$

$$M * Y_j + \sum_{ik \in [0,45,-45,90]} X_{ijk} \geq 0 \quad (9b)$$

$$\sum_{j \in \{inner\ block\ in\ one\ side\ of\ mid\text{-}plane\}} Y_j = \quad (10a)$$

$$\sum_{j \in \{inner\ block\ in\ the\ other\ side\ of\ mid\text{-}plane\}} Y_j \quad (10b)$$

$$X_{i0,45} = 1 \quad \forall\, i \quad (11a)$$

$$X_{i1,90} = 1 \quad \forall\, i \quad (11b)$$

$$X_{i2,-45} = 1 \quad \forall\, i \quad (11c)$$

$$X_{i3,0} = 1 \quad \forall\, i \quad (11d)$$

$$X_{ij,empty} = 1 \quad \forall\, i \text{ on free edge, } j \text{ in mid-plane} \quad (12a)$$

$$X_{ij,0} + X_{ij',0} = 1 \quad \forall\, i \text{ not on free edge, } j, j' \text{ in mid-plane, } n_{i0} = odd \quad (12b)$$

$$X_{ij,0} + X_{ij',0} = 2 \quad \forall\, i \text{ not on free edge, } j, j' \text{ in mid-plane, } n_{i0} = even \quad (12c)$$

In this example, the objective function (4) maximizes the total length of all edges that are not boundary edges, which is equivalent to minimizing the boundary length. The length of a common edge between panels i and i' is represented by $w_{ii'}$. The second term in the objective function is a small penalty that is applied if a panel uses the inner block, in order to force panels to use outer blocks, which will decrease stacking sequence rule violation. However, p is small enough such that the total ply boundary still drives most of the objective function.

A main constraint of ply shape optimization is constraint (5), which ensures that the number of plies for each orientation in each panel matches what was given by the user. If the ply sequence does not belong to the inner blocks, the number is multiplied by two to account for symmetry. Constraint (6) is an assignment constraint which ensures each panel will pick at most one sublaminate for each outer block. Note that each block has its own set of compatible sublaminate candidates that the optimizer is allowed to pick from.

The remaining constraints ensure that all variables are linked correctly. Constraint (7) links X variables and Y variables. M represents the total number of panels. This constraint forces X variables to be zero if Y value is zero for corresponding orientation k. In other words, this constraint forces X variables to be zero for all orientations that do not match the orientation in the guide. For an orientation that is used, thus having Y value as one, the constraint becomes non-active. Constraint (8) links X variables and Z variables. For ply sequences in outer blocks for each panel, this constraint ensures that X variables inherit their values from the sublaminate that was picked.

Since inner blocks are allowed to violate the stacking sequence rules, there is a risk of the expected mid-plane of the design not actually being the mid-plane. Constraints (9a) and (9b) identify whether a ply sequence in an inner block was used or not. Constraints (10a) and (10b) ensure the number of ply sequences used in the inner blocks on one side of the mid-plane is equal to the number of ply sequences on the other side, which makes the mid-plane a true mid-plane which might not be the same as the guide symmetry plane. Commercial optimization software such as provided by Gurobi may be used for both the guide generation and ply shape optimization.

In this example, constraints (11) and (12) are fixed values. The constraint (11) forces the X value so that the first ply sequence will be a full ply with 45° and will be followed by a full ply with 90°, −45°, and 0°. In effect, constraint (5) may be equivalent to the most outer block being fixed. Thus, this may ensure that a stacking sequence rule is satisfied by definition.

The constraint (12) regards two ply sequences in mid-plane. In this example, the controller assumes that the total number of ply sequences is even, which guarantees two ply sequences in the mid-plane. Constraint (12a) ensures that the free edges will not be taped. Constraint (12b) ensures that if a panel is not on a free edge of the composite part two 0° plies are present at the laminate mid-plane if the number of 0° plies is an even number. Constraint (12c) ensures only one 0° ply is present at the mid-plane if the number of 0° plies is an odd number.

Instead of allowing each ply in the inner blocks to be optimized independent of each other, the inner blocks may also be optimized using a library. Symmetry might be impossible if more than one ply orientation has an odd number of plies, and therefore the sublaminates for the inner blocks may not be filtered based on symmetry violation. Instead, sublaminates that violate symmetry might be assigned a penalty based on the degree of symmetry violation that may be added to the objective function if they are used.

User inputs may also be provided to the controller, such as a maximum allowed solution time, a number of total ply sequences in the guide, and a number of ply sequences in the inner blocks. Manufacturability improves as more time is allowed for the optimization. The total boundary reduces as the solution time increases, which is expected since this is the main part of the objective function for ply shape optimization.

Parameter Feasibility Analysis

Composite design system 110 may further implement feasibility analysis, prior to performing optimization (e.g., prior to the search for and scoring of solutions dictating the placement of specific sublaminates at specific panels of the composite part). This saves time and licensing costs by preventing optimization from being performed for parameter sets that result in an infeasible optimization problem. In one embodiment, composite design system 110 prevents optimization whenever a compliant combination of sublaminates does not exist for every panel of the composite part. System 110 may further provide feedback indicating how constraints may be altered to ensure that a feasible solution is likely. For example, feedback may indicate specific panels for which no rules-compliant sublaminates exist, or may indicate a change that is likely to result in feasible solutions.

To further illustrate the problem, when a user inputs ply counts to composite design system 110 for each panel, it remains possible that there are no feasible solutions that comply with all of the ply counts. This issue may be compounded depending on the stacking sequence rules used to generate sublaminates, as solutions may exist for one library of sublaminates generated under a first set of stacking sequence rules, yet not exist for a different library of sublaminates generated under a second set of stacking sequence rules. The feasibility analysis performed by controller 112 helps to ensure that at least one solution exists where the ply counts for the panels do not come into conflict with the stacking sequence rules for the sublaminates.

In this embodiment, before engaging in optimization, controller 112 reviews the ply counts for each panel in combination with stacking sequence rules for sublaminates, in order to ensure that a solution can be found. Thus, instead of engaging in a full optimization process by rote, which may utilize hours of time and/or valuable software licenses, controller 112 selectively determines whether to perform optimization, depending on the results of the feasibility analysis.

As discussed above, sublaminates in the library may be chosen to obey stacking sequence rules. By creating ply shapes and stacking sequences only from sublaminates already known to obey the stacking sequence rules, solutions constructed from these sublaminates are intended to reduce the chances of non-compliance. Regardless of the measures taken above to ensure compliance with stacking sequence rules, the sublaminates may not always be compatible with ply counts for panels of the composite part. That is, generated sublaminates may not comply with desired/predefined ply counts for panels. For example, while stacking sequence rules may indicate combinations of ply orientations that are permissible on a global level, the number of plies per orientation for these permissible combinations might not match the number of plies per orientation specified for individual panels. This means that sublaminates which are individually compliant with stacking sequence rules cannot always be combined into a laminate that conforms with the ply counts required, which may vary from panel to panel. These issues may be particularly difficult to locate manually, as such conflicts may exist in just a few panels on the composite part. If stacking sequence rules are infeasible in light of the ply counts for the panels, the user must either change the number of blocks permitted (i.e., the number of sublaminates allowed to fill in each panel), alter the stacking sequence rules, and/or change the size of the sublaminates, followed by retrying the feasibility check.

Further discussion of the operations of controller 112 while performing feasibility analysis are provided with regard to FIG. 16. Assume, for this embodiment, that a user has provided a set of stacking sequence rules and ply counts, and has requested that optimization be performed for a multi-panel composite part based on the provided rules. For example, the user may specifically request feasibility analysis via a user interface, or may request that optimization be performed, in which case controller 112 may engage in a "preflight" feasibility analysis in order to determine whether to prevent optimization.

Controller 112 identifies stacking sequence rules for sublaminates (e.g., as input by the user) (step 1602). The sublaminates comprise consecutively stacked layers, and are utilized during optimization such that they are stacked together to fill a panel. The stacking sequence rules constrain the composition of the sublaminates. For example, the stacking sequence rules may define allowable ply sequences within a sublaminate, may define a minimum number and a maximum number of plies for a sublaminate, on a fiber orientation-by-fiber orientation basis, may define allowable numbers of consecutive plies having the same fiber orientation, etc.

When engaging in feasibility analysis, controller 112 searches over the entire composite geometry (e.g., each panel) of the composite part. Thus, controller 112 determines that not all panels of the composite part have been checked for compliance (step 1604), and identifies a panel of the composite part for feasibility analysis (step 1606). Controller 112 proceeds to identify ply counts for the panel. The ply counts constrain a number of plies at the panel, and may for example comprise single numbers indicating the value of various constraints (step 1608).

Controller 112 further selects the allowed number of sublaminates ($N_S$) to be used in the optimization routine (step 1610). For example, if $N_S=2$, then up to two individual sublaminates may be used at each panel to "fill in" the panel with plies. Next, controller 112 calculates ply count ranges for a resulting laminate, based on $N_S$ and the stacking sequence rules (step 1612).

Controller 112 further determines whether the ply counts for the panel comply with the ply count ranges for the laminate (step 1614). This may be performed in order to determine stacking sequence rules and/or values of $N_S$ for which a solution could hypothetically be found for the composite part. Such analysis helps to eliminate infeasible stacking sequence rules and numbers of sublaminates from being considered during optimization.

A feasible problem may exist if a number of sublaminates, $N_S^{opt}$, can be determined for which all panels have at least one $N_S \leq N_S^{opt}$ for which all constraints below are satisfied. Thus, for every panel, I, controller 112 determines if $N_S$ can satisfy the specified ply counts, $N_{ik}$. Controller 112 checks the ply counts for each fiber orientation, k:

$$N_k^s + N_k^{min} \cdot N_S \leq N_{ik} \leq N_k^s + N_k^{max} \cdot N_S \qquad (13)$$

Where $N_k^{min}$ and $N_k^{max}$ are the minimum and maximum number of plies for orientation k allowed in a single sublaminate, and $N_k^s$ is the total number of (fixed) surface plies with orientation k in the total laminate.

For a more precise determination the equation above can be made to distinguish between inner and outer sublaminates.

$$N_k^s + N_k^{min\_inner} \cdot N_{S\_inner} + 2 \ast (N_k^{min\_outer} \cdot N_{S\_outer})$$
$$\leq N_{ik} \leq N_k^s + N_k^{max\_inner} \cdot N_{S_{inner}} + 2 \ast$$
$$(N_k^{max\_outer} \cdot N_{S\_outer}) \qquad (14)$$

where $N_k^{min}$ and $N_k^{max}$ can be different for the inner and the outer sublaminates. $N_{S\_inner}$ is the total number of inner sublaminates, while $N_{S\_outer}$ is half of the number of outer sublaminates (since each half is a mirror image of the other).

Controller 112 may additionally ensure that the range for the total number of plies for the laminate complies with the total ply count for that panel:

$$\sum_{k=1}^{N_{angles}} N_k^s + N_S \cdot \min\left(N_t^{min}, \sum_{k=1}^{N_{angles}} N_k^{min}\right) \leq \qquad (15)$$

$$\sum_{k=1}^{N_{angles}} N_{ik} \leq \sum_{k=1}^{N_{angles}} N_k^s + \max\left(N_t^{max}, \sum_{k=1}^{N_{angles}} N_k^{max}\right)$$

where $N_t^{min}$ and $N_t^{max}$ are the minimum and maximum plies a sublaminate is allowed to have, regardless of orientation.

The minimum and maximum number of plies per orientation per sublaminate may be based on the following: $N_k^{min}$ is the larger of a value set directly by the user, and a maximum number of plies allowed for a specific fiber orientation, and $N_k^{max}$ is the smallest of the value set directly by the user, and the number that results from the following equation:

$$N_k^{max} = N_t^{max} - \sum_{j=1}^{N_{angles}} (N_j^{min} \text{ for } j \neq k) \qquad (16)$$

Furthermore, the minimum number of plies per sublaminate may be defined as $$N_t^{min} = \sum_{k=1}^{N_{angles}} N_k^{min} \qquad (17)$$

and the maximum total number of plies per sublaminate should be larger than (or equal to) the minimum total number of plies, as indicated by:

$$N_t^{min} \leq N_t^{max} \qquad (18)$$

Using the above calculations and formulae, controller 112 may determine whether an infeasibility exists for a given $N_S$, set of stacking sequence rules, and ply counts. Thus, controller 112 may automatically determine if ply counts for the panel have a possibility of being met, may automatically identify whether infeasibility will occur at the panel being analyzed, and may automatically identify how many sublaminates would be required given the rules in order to be assured at least one solution exists within the solution space.

By way of example, if five sublaminates were selected, with the stacking sequence rules requiring at least two 0° plies per sublaminate, and a panel only needs eight 0° plies, no solution will exist for that panel because five sublaminates will always result in at least ten 0° plies. In such an example, the laminate orientation, panel where the issue occurs, and type of violation may be indicated to the user to identify which rules should be modified. In this example, the stacking sequence rules could be modified to require only one 0° ply per sublaminate. Controller 112 may further proceed to check each of multiple different numbers of sublaminates (step 1616), in order to determine which ranges of numbers of sublaminates will be compliant with the ply counts specified for the panel. This may be performed, for example, by calculating additional ply count ranges for the panel (each additional ply count corresponding to a different number of sublaminates), and determining whether the ply counts specified for the panel comply with additional ply count ranges for the panel.

If not all desired numbers of sublaminates have been checked for compliance, then controller 112 may return to step 1610. Otherwise, controller 112 may proceed to step 1604 and identify a next panel of the composite part to check for compliance, until each panel of the composite part has been analyzed.

In further embodiments, controller 112 may determine that the next panel to be analyzed has ply counts specified that are the same as ply counts specified for a panel that has already been analyzed. Hence, controller 112 may forego steps 1610, 1612, and 1614, since a functionally identical panel has already been checked for compliance. In embodiments where inner and outer sublaminates are distinguished, steps 1610-1616 may be performed as two separate loops, where different $N_S$ values for inner and outer blocks may be used. For example $N_S$ for inner blocks may be less than or equal to four, while $N_S$ for outer blocks may be any suitably high number.

FIG. 17 is a table illustrating a comparison of ply count ranges for a laminate 1700 to ply counts for a panel of a composite part in an exemplary embodiment. As shown in FIG. 17, possible ply count ranges 1710 for a panel are determined based on $N_S$, the number of sublaminates to be used during optimization (in this case, $N_S=3$), in addition to stacking sequence rules 1712 for those sublaminates. The available ply count ranges 1710 are compared to the ply counts specified for the panel ("panel ply count req'mt"). So long as the available ply count ranges 1720 include the desired ply counts specified for each fiber orientation, a solution should be available for the panel. In this case, for the current value of $N_S$, no solution can be found, because the range at +90° does not include the ply count. This result ("NO") is indicated at cell 1730.

After all desired panels have been checked for compliance (e.g., all panels at the composite part) controller 112 further generates a report indicating which values of $N_S$ are compatible for specific panels and/or the entire composite part, and transmits an instruction to display 118 to present the report to a user (step 1618). The report indicates whether ply counts specified for the panels of the composite part are compliant with the ply count ranges provided by the sublaminates. The report may indicate whether the stacking sequence rules and/or ply counts are infeasible (i.e., if the rules are determined to have no possible solution). The report may further indicate if a modification to $N_S$ would cause the rules to be feasible. Furthermore, if infeasibilities are found, then the locations of these infeasibilities (e.g., panels at which the rules cannot be complied with) are provided. For example, this detailed information may indicate which specific rules cannot be complied with at a panel.

FIG. 18 illustrates a report 1800 presented via a display 118 for indicating detected compliance issues to a user. In this case, report 1800 indicates a location at which the noncompliance was detected (Panel 1), the nature of the noncompliance (90° ply count conflict), and a potential solution to the noncompliance (changing $N_S$ from three to four). In further embodiments, the report indicates which values of $N_S$ have ply count ranges that are fully compliant with the ply counts specified for the panels. In a further embodiment, controller 112 actively prevents optimization of the composite part in response to detecting that the ply count ranges for at least one panel of the composite part do not comply with the ply counts specified for that panel.

Sublaminate Family Generation

The various optimization techniques and systems described above may be further enhanced by controller 112 engaging in automatic generation of sublaminate libraries. This ensures that each time a new set of stacking sequence rules is defined, a new library of sublaminates in compliance with those stacking sequence rules may be rapidly deployed for use in optimization.

In one embodiment, controller 112 automatically identifies and generates all possible rules-compliant sublaminates up to a specified size. This enables a complete library of sublaminates to be created once for a set of stacking sequence rules, regardless of whether the block size for that set of rules is changed. A new conforming library may thus be quickly generated by controller 112 within seconds or minutes, and sublaminates from this library may then be utilized when optimizing the composite part. Since design of composite parts is often an iterative process, the ability to rapidly adapt the library of sublaminates to new sets of rules is highly beneficial and saves a great deal of time. Furthermore, the libraries generated via the techniques described below may be utilized by different designers in order to explore the varying characteristics of sublaminates that comply with different sets of rules.

Controller 112 acquires the stacking sequence rules (e.g., from a user or from memory 116), and determines a maximum number of plies/layers to utilize in a sublaminate. The stacking sequence rules indicate how plies of different orientations should be stacked in a sublaminate. In embodiments where the stacking sequence rules are qualitative, controller 112 engages in a mathematical interpretation of these stacking sequence rules in order to translate the qualitative rules into quantitative rules. For example, controller 112 may replace a qualitative requirement for "interspersed orientations" of plies with a requirement that no fiber orientation repeats more than three times within a panel.

Exemplary quantitative rules may include a minimum total ply constraint indicating a minimum number of total plies to be used in one or more panels, a minimum ply constraint indicating a minimum number of plies to be used per ply orientation at a panel, and a maximum ply constraint indicating a maximum number of plies to be used per ply orientation at a panel. In this manner, stacking sequence rules may define allowable ranges of ply counts for a sublaminate on a fiber orientation-by-fiber orientation basis. Further quantitative rules include a minimum consecutive ply constraint indicating a minimum number of plies of the specified orientation to be stacked consecutively at a panel, and a maximum consecutive ply constraint indicating the maximum number of plies of the a specified orientation to be stacked consecutively at a panel. Thus, stacking sequence rules may define allowable numbers of consecutive plies of the same fiber orientation. Still further quantitative rules include an active sequence constraint specifying that a particular ply at a panel has a specified orientation (or be one of a set of specified orientations), an alternating set constraint requiring that plies of specified orientations must always alternate with respect to each other throughout a sublaminate, and a disallowed permutation defining consecutive sequences of fiber orientations that are disallowed from appearing in a sublaminate. These rules, and the rules discussed in other sections, may be combined and modified in any suitable manner.

Once a set of quantitative stacking sequence rules are determined, controller 112 engages in a two-stage process. In the first stage, some of the stacking sequence rules are used to prune a tree of candidate sublaminates. After pruning, each sublaminate in the tree is a candidate in that it potentially complies with all stacking sequence rules, but is not yet guaranteed to conform to all such rules. The tree may be generated via recursion, which greatly alleviates the computational time required to generate a full sublaminate library, since branches of the tree that are non-compliant may be pruned at an early stage. The second stage reviews the sublaminate candidate tree, and checks each possible branch that may be rules-compliant. Any candidate sublaminates that violate the full set of rules are also pruned. The resulting pruned tree is thus guaranteed to consist only of sublaminates that conform to the stacking sequence rules.

The primary objective of the generation process is to produce every possible rule-conforming sublaminate up to the maximum number of layers. For example, controller 112 may generate a library of all sublaminates that comply with the set of rules described in Table 2 above. However, as mentioned above, the generation process may be performed repeatedly in order to generate new libraries of sublaminates for new sets of rules.

Figure 19:
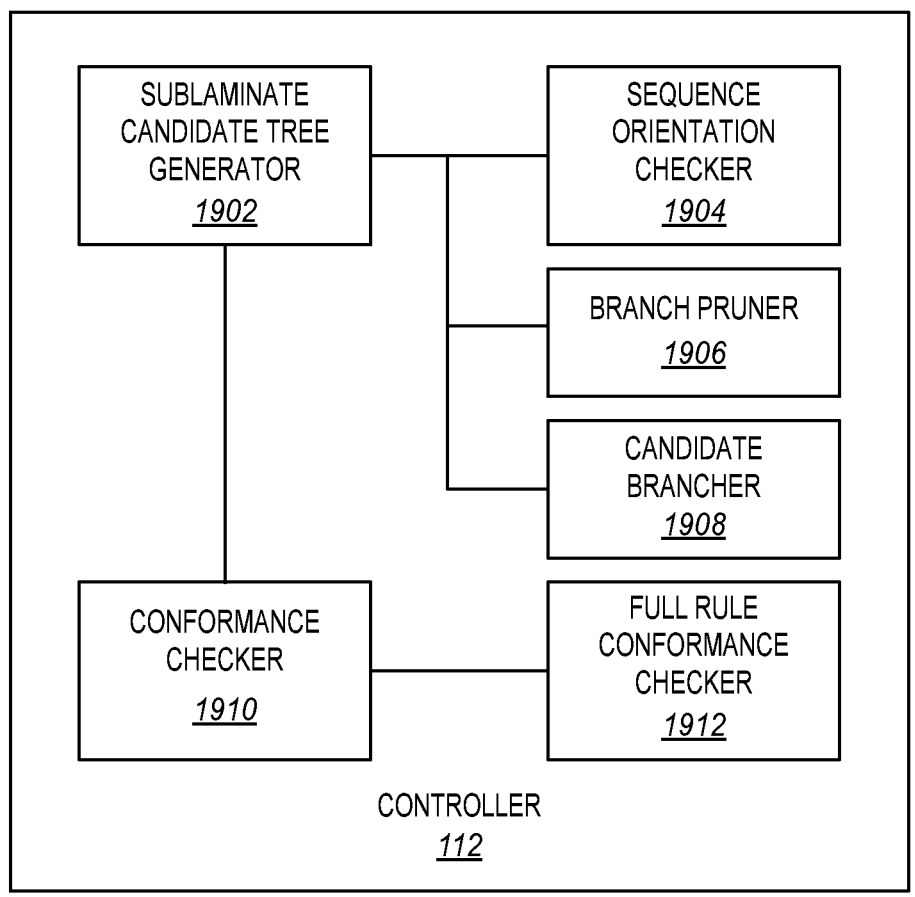
FIG. 19 is a block diagram illustrating components of a controller of a composite design system in an exemplary embodiment.

Controller 112 may include multiple components, implemented by a hardware processor or as independent hardware, in order to engage in tree generation. As illustrated by FIG. 19, these components may include a sublaminate candidate tree generator 1902 which generates a tree of candidate sublaminates, and a conformance checker 1910 that prunes branches of candidate sublaminates that fail to comply with all of the stacking sequence rules. Sublaminate candidate tree generator 1902 may utilize sequence orientation checker 1904 to check sublaminates for compliance with stacking sequence rules, may utilize branch pruner 1906 to remove sublaminates that do not comply with stacking sequence rules, and may utilize candidate brancher 1908 to generate new sublaminates from prior sublaminates. Conformance checker 1912 may utilize full conformance checker 1912 to check a generated tree of candidate sublaminates for compliance with additional rules.

Figure 20:
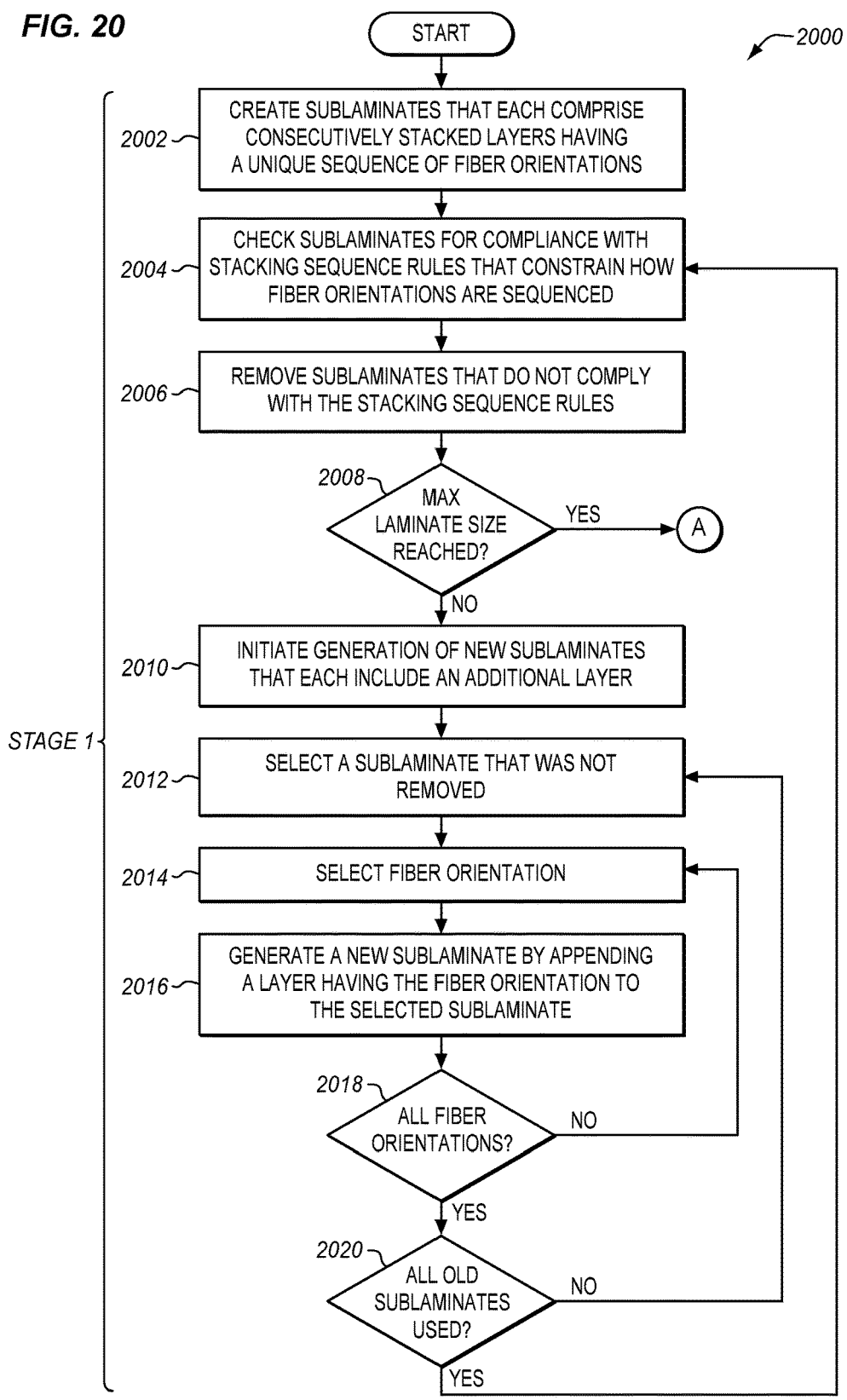
FIGS. 20-21 are flowcharts illustrating a method for generating libraries of sublaminates in an exemplary embodiment.
Figure 21:
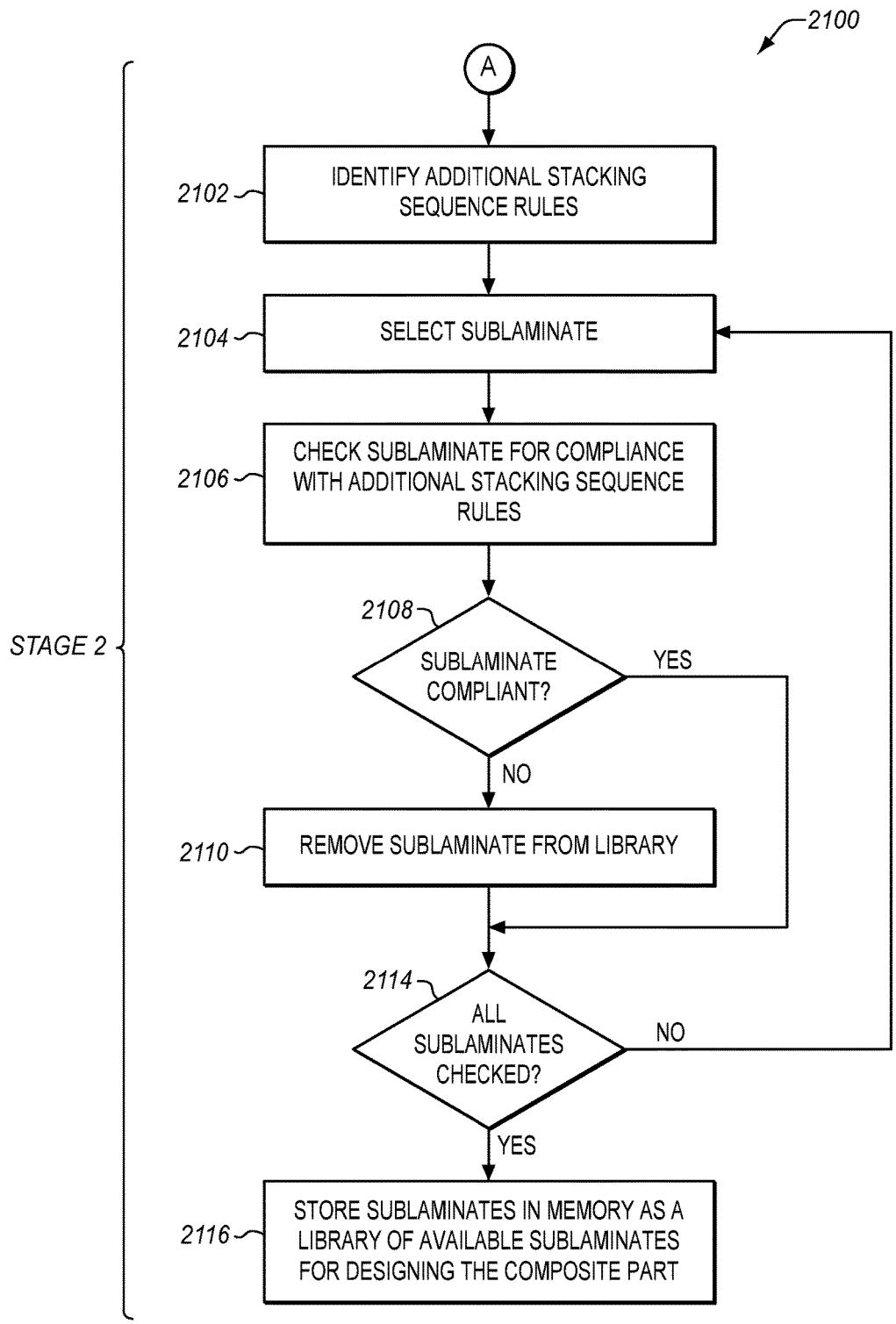

Assume, for this embodiment, that a user has modified the stacking sequence rules, and desires to generate a new library of sublaminates that are compliant with the new stacking sequence rules. Controller 112 detects the change to the stacking sequence rules, and initiates the two-stage creation of a new library of sublaminates in response to the change, as illustrated in FIGS. 20-21.

Stage one comprises controller 112 generating a list of candidate sublaminates via a tree. Utilizing a tree to validate the sublaminates ensures that non-compliant branches of sublaminates are pruned as early as possible, which reduces overall processing time when generating the library. Stage one includes controller 112 creating "root" sublaminates that each comprise consecutively stacked layers/plies having a unique sequence of fiber orientations (step 2002). These root sublaminates may be created for example, with a selected minimum number of layers. The root sublaminates are basic sublaminates from which larger sublaminates are created. Controller 112 checks the newly created sublaminates for compliance with stacking sequence rules that constrain how fiber orientations are sequenced across the layers of the sublaminates (step 2004). For example, this may include checking compliance with minimum, maximum, and/or consecutive ply count limits imposed on the new sublaminates on a fiber orientation-by-fiber orientation basis, checking active sequencing constraints applied to the "top" of the stack, checking for disallowed sequences of fiber orientations, and/or checking for discrepancies in fiber orientations that are expected to alternate. For example, if +45° and −45° fiber orientations are expected to be paired or alternate with each other throughout a sublaminate, controller 112 may count the number of layers having +45° and −45° fiber orientations. If the number of +45° layers is more than one greater or less than the number of −45° layers, then the sublaminate may be non-compliant with such pairing rules and hence discarded.

Controller 112 proceeds to remove newly created sublaminates that do not comply with the stacking sequence rules (2006), and checks to see whether a maximum sublaminate size (i.e., a maximum number of layers) has been reached (step 2008). If the maximum size has not yet been reached, controller 112 may flag the most recently generated sublaminates as old sublaminates. These old sublaminates will be used in the generation of new sublaminates that each include an additional layer (step 2010). The new sublaminates are created based on the old sublaminates, by adding a layer to the old sublaminates to create a new sublaminate having a unique sequence of fiber orientations.

Specifically, the generation process includes selecting an old sublaminate that was not removed (step 2012), and selecting a unique fiber orientation for a layer that will be added to the old sublaminate (step 2014). Controller 112 then generates a new sublaminate by appending the layer having the fiber orientation to the old sublaminate (step 2016). If all available fiber orientations (e.g., 0°, +45°, −45°90°) have not been used to create new sublaminates (step 2018) from the old sublaminate, another fiber orientation is selected in step 2012 and a another new sublaminate is generated from the old sublaminate.

In one embodiment, when selecting fiber orientations for the new layer, sequence orientation checker 1904 reviews each potential fiber orientation for the new layer, and constructs a list of fiber orientations permitted for the new layer. With the permitted orientations known, candidate brancher 1908 traverses all leaves in the sublaminate candidate tree, and appends each angle of the permitted orientations as a new branch. Once each branch has been created, the branch pruner 1906 checks all of the new branches for violations of the stacking sequence rules. Any branch found to be rejected due to a rule violation is pruned, and thus no further branches will be produced along that path.

Alternatively, if all available fiber orientations have been used to created new sublaminates for the selected old sublaminate, then controller 112 checks to see if all remaining old sublaminates (e.g., having the prior number of layers) have been used to create new sublaminates (step 2020). If more old sublaminates remain, then controller 112 selects another old sublaminate in step 2012, and proceeds to generate further new sublaminates. Alternatively, if all old sublaminates have been used to create new sublaminates, processing returns to step 2004. In this manner, controller 112 iteratively repeats checking, removing, and generating new sublaminates until a maximum number of layers has been reached.

As described above, the process may be performed iteratively, repeating each time that a new layer is added to the sublaminate library. Hence, the process may initiate with sublaminates having X layers (e.g., three layers), and then proceed to laminates having X+1 layers, and so on. In this manner, the process continues until sublaminates having a maximum size have been generated and checked for compliance with the stacking sequence rules. In one embodiment, the controller repeats the checking, removing, and generating recursively by traversing an integer tree, wherein each sublaminate comprises a node in the integer tree, and a number of branches from each sublaminate corresponds with a number of available fiber orientations. The number and type of available fiber orientations may vary.

After the tree has been filled with sublaminates up to the maximum size and pruned, all sublaminates left in the tree are considered candidate sublaminates, in that they are potentially fully compliant with the rules. However, some rules may not be amenable to analysis until after a sublaminate has been fully completed. For example, active sequencing rules that are considered from the bottom of the stack, instead of the top of the stack of a sublaminate, are not considered during method 2000 because these constraints may prune branches from which viable sublaminates may be generated. If an active sequencing rule was applied during tree generation that specified that the last angle of a sublaminate must be 0°, then branch pruner 1906 pruner would remove sublaminates that did not end in a 0° ply. However, larger sublaminates that included such a removed sublaminate and still ended in 0° would also be eliminated by this process, so pruning early would result in missed conforming sublaminates. Thus, conformance checker withholds review of sublaminates for compliance with such rules until the tree has been completed and filled with candidates.

Since checking for compliance with all rules is not desirable during the generation of the tree, compliance with additional stacking sequence rules may be checked in a second stage after the tree has been generated by method 2000. In the second stage, conformance checker 1910 checks all rules not checked by branch pruner 1906. Thus, each candidate sublaminate existing in the tree after the completion of the first stage is passed to conformance checker 1910, which either accepts or rejects the sublaminate based on the additional stacking sequence rules. If any rule is violated, the candidate sublaminate is rejected. At the end of this process, only those candidate sublaminates that successfully meet all stacking sequence rules remain. These sublaminates are returned as output, and may be stored in memory 116 as a sublaminate library for use in the optimization processes discussed above.

FIG. 21 provides method 2100 for checking compliance of the candidate sublaminates with additional stacking sequence rules in a second stage of analysis. Method 2100 enables controller 112, after the tree has been generated, to check all sublaminates that have not yet been removed for compliance with additional stacking sequence rules, and remove sublaminates that do not comply with the additional stacking sequence rules. According to method 2100, Controller 112 identifies additional stacking sequence rules, such as "bottom up" sequencing requirements (e.g., requiring a specific ordered set of fiber orientations in the bottom X layers of a sublaminate), or requirements that disallow deviations between paired fiber orientations. For example, an additional stacking sequence rule may indicate that plies of a first fiber orientation (e.g., +45°) must be paired with plies of a second fiber orientation (e.g., −45°). A check for deviations may actively review layers of a sublaminate from top down, confirming that whenever one layer having a fiber orientation that should be paired is encountered, it is followed by the other fiber orientation in the pair before repeating. For example, a check may confirm that each time a +45° layer or −45° layer is encountered, it is followed by a layer of the other paired fiber orientation (e.g., −45° and +45°, respectively) before it is repeated.

Controller 112 further selects a candidate sublaminate (step 2104), and checks the selected candidate sublaminate for compliance with the additional stacking sequence rules (step 2106). If the sublaminate is noncompliant (step 2108), it is removed (step 2110). Alternatively, if the sublaminate is compliant, processing proceeds onward without removing the sublaminate. Controller 112 determines whether all candidate sublaminates have been checked for compliance with the additional stacking sequence rules (step 2114). If not all candidate sublaminates have been checked, processing returns to step 2014 and a new candidate sublaminate is selected. If all candidate sublaminates have been checked, then controller 2116 stores the sublaminates in memory 116 as a library of available sublaminates for designing the composite part (step 2116).

Figure 22:
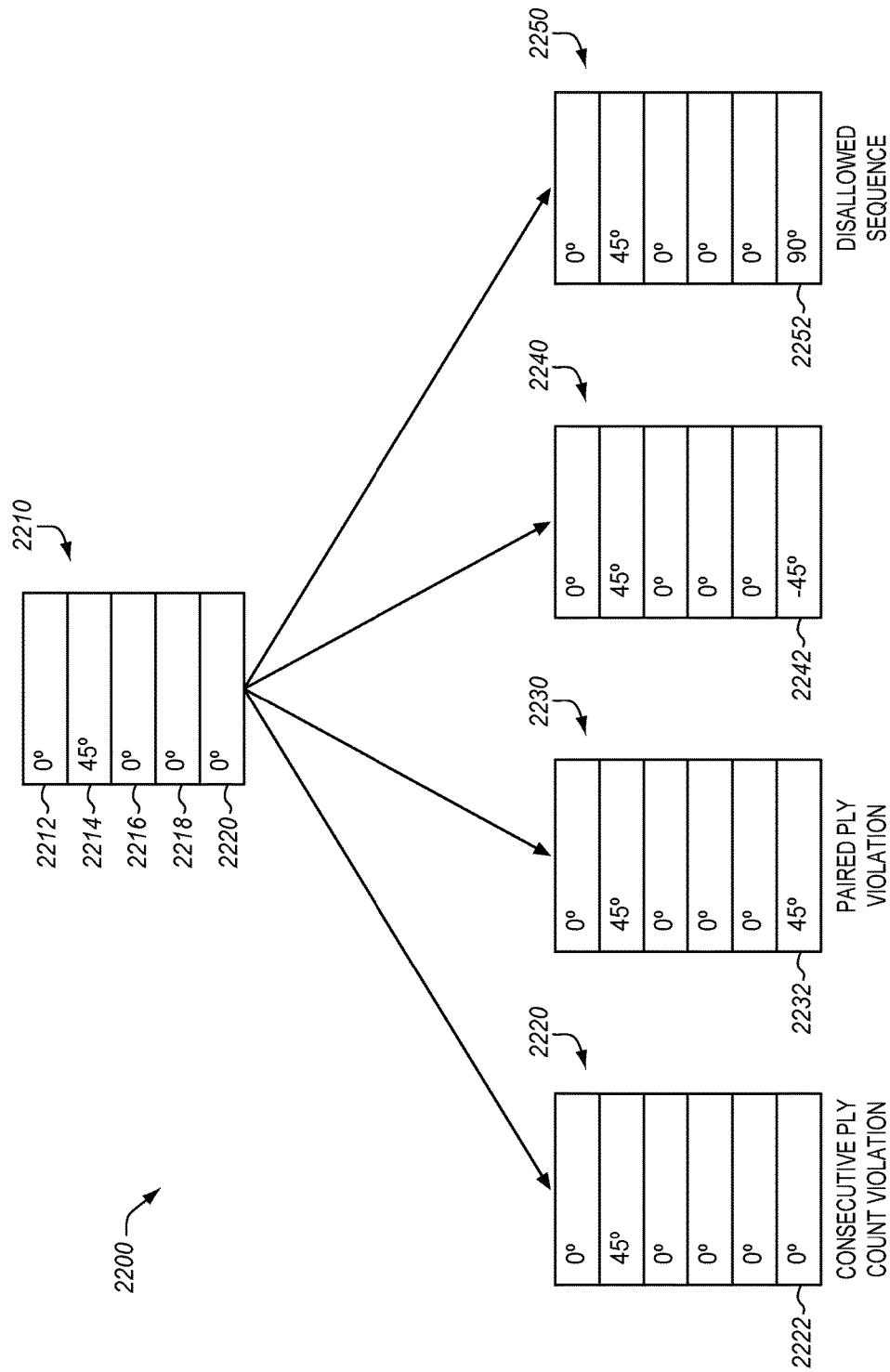
FIG. 22 is a diagram illustrating branching of an integer tree used to generate a library of sublaminates in an exemplary embodiment.

FIG. 22 shows an example of the process of branch generation for a tree 2200 comprising a single old sublaminate 2210 having four plies 2212, 2214, 2216, and 2218 oriented at [0°/45°/0°/0°]. In this example, there are four allowed fiber orientations for any given ply: 0°, 45°, −45°, and 90°. Sequence orientation checker 1904 allows all four new orientations to be considered as candidates, since there are no active sequence constraints on this sequence. Candidate brancher 1908 then produces four new sublaminates that branch from sublaminate 2210, corresponding to the various new sublaminates that could be produced by appending these four orientations to the current sublaminate candidate node. Branch pruner 1906 then identifies that three of these four new sublaminates violate different stacking sequence rules. First new sublaminate 2220 includes layer 2222, which violates a maximum consecutive ply constraint of at most two 0° plies together. First new sublaminate 2220 would yield three consecutive 0° plies, and thus is removed. Second new sublaminate 2230 includes layer 2232 which violates a paired ply rule (e.g., an alternating set constraint) that was provided, since two 45° orientations appear without an interim −45°. Third new sublaminate 2240 is permissible as new layer 2242 results in no violation of stacking sequence rules. However, fourth new sublaminate 2250 includes layer 2252 which violates a disallowed sequence constraint indicating that the sequence [0°/0°/0°/90°] is not permitted to appear in any sublaminate. Thus, branch pruner 1906 removes the three new sublaminates that do not comply with the rules. Only one branch remains as a permissible new sublaminate.

Application to Aircraft Manufacturing

Figure 23:
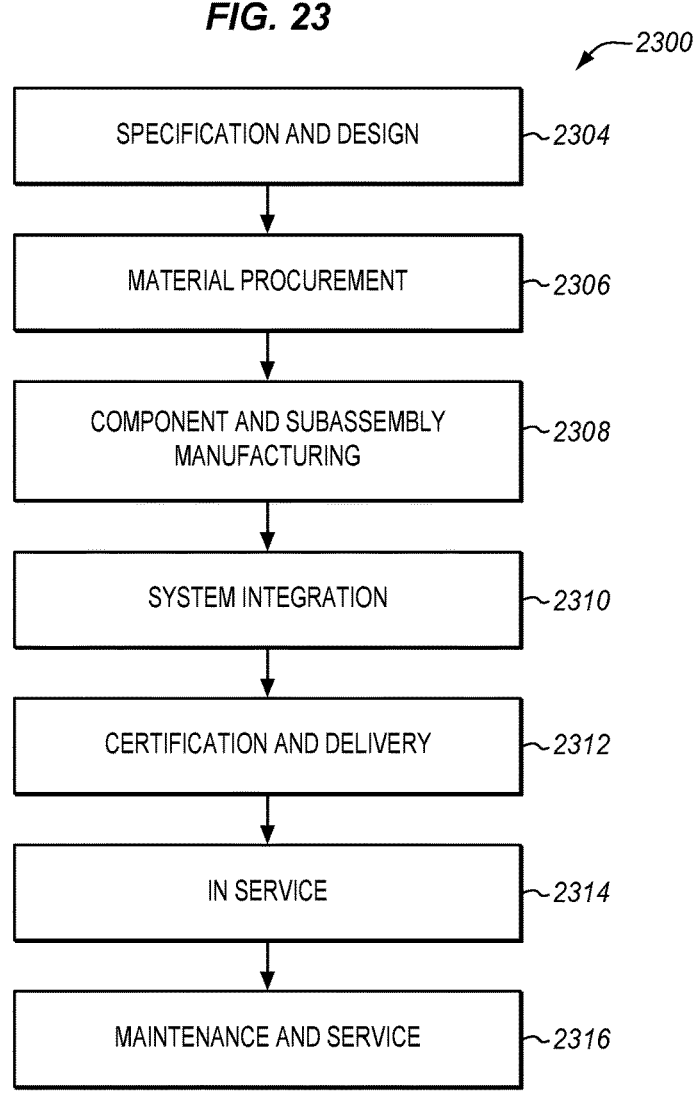
FIG. 23 is a flow diagram of aircraft production and service methodology in an exemplary embodiment.
Figure 24:
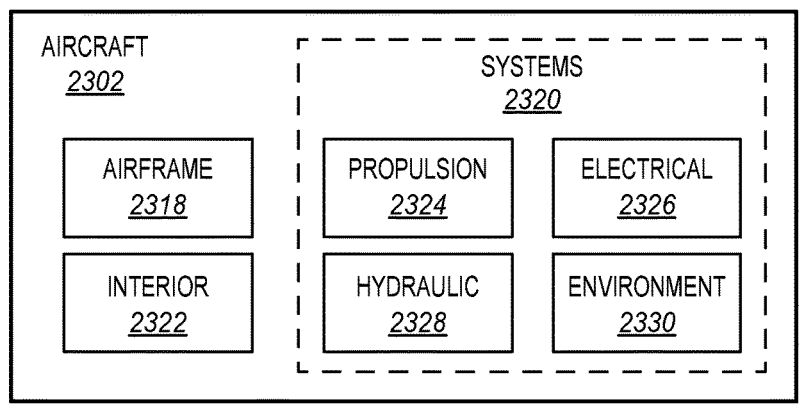
FIG. 24 is a block diagram of an aircraft in an exemplary embodiment.

Referring more particularly to the drawings, embodiments of the disclosure may be described in the context of an aircraft manufacturing and service method 2300 as shown in FIG. 23 and an aircraft 2302 as shown in FIG. 24. During pre-production, exemplary method 2300 may include specification and design 2304 of the aircraft 2302 and material procurement 2306. During production, component and subassembly manufacturing 2308 and system integration 2310 of the aircraft 2302 takes place. Thereafter, the aircraft 2302 may go through certification and delivery 2312 in order to be placed in service 2314. While in service by a customer, the aircraft 2302 is scheduled for routine maintenance and service 2316 (which may also include modification, reconfiguration, refurbishment, and so on).

Each of the processes of method 2300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 24, the aircraft 2302 produced by exemplary method 2300 may include an airframe 2318 with a plurality of systems 2320 and an interior 2322. Examples of high-level systems 2320 include one or more of a propulsion system 2324, an electrical system 2326, a hydraulic system 2328, and an environmental system 2330. Any number of other systems may be included. Although an aerospace example is shown, the principles of the invention may be applied to other industries, such as the automotive industry.

Apparatus and methods embodied herein may be employed during any one or more of the stages of the production and service method 2300. For example, components or subassemblies corresponding to production stage 2308 may be fabricated or manufactured in a manner similar to components or subassemblies produced while the aircraft 2302 is in service. Also, one or more apparatus embodiments, method embodiments, or a combination thereof may be utilized during the production stages 2308 and 2310, for example, by substantially expediting assembly of or reducing the cost of an aircraft 2302. Similarly, one or more of apparatus embodiments, method embodiments, or a combination thereof may be utilized while the aircraft 2302 is in service, for example and without limitation, to maintenance and service 2316.

In one embodiment, composite design system 110 is utilized during specification and design of composite parts for a portion of airframe 118. This allows composite part 150 to be manufactured in component and subassembly manufacturing 2308, and then be assembled into an aircraft in system integration 2310. Part 150 may then be utilized in service 2314 until wear renders part 150 unusable. Then, in maintenance and service 2316, part 150 may be discarded and replaced with a newly manufactured part 150 based on a design created by composite design system 110.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A method of creating a library of sublaminates used in optimizing fiber orientations of a multi-layer composite part subdivided into panels that each comprise a fraction of the area of the composite part, the method comprising:
  creating an integer tree of sublaminates that each comprise consecutively stacked layers having a unique sequence of fiber orientations;
  checking the sublaminates, based on the fiber orientations of the consecutively stacked layers of the sublaminates, for compliance with stacking sequence rules that constrain how fiber orientations are sequenced;
  pruning branches from the integer tree by removing sublaminates that do not comply with the stacking sequence rules;
  generating new sublaminates that each include an additional layer, by, for each of multiple fiber orientations:
    selecting a sublaminate that was not removed; and creating a new branch within the integer tree by generating a new sublaminate by appending a layer having the fiber orientation to the selected sublaminate;

repeating the checking, the removing, and the generating at the integer tree until a maximum number of layers has been reached; and storing the sublaminates in memory as a library of available sublaminates for designing the composite part.

2. The method of claim 1 further comprising:

after the maximum number of layers has been reached, checking all sublaminates that have not yet been removed for compliance with additional stacking sequence rules; and pruning branches from the integer tree by removing sublaminates that do not comply with the additional stacking sequence rules.

3. The method of claim 2 wherein:

the additional stacking sequence rules indicate that plies of a first fiber orientation must be paired with plies of a second fiber orientation.

4. The method of claim 1 wherein:

repeating the checking, the removing, and the generating is performed recursively by traversing the integer tree, wherein each sublaminate comprises a node in the integer tree, and a number of branches from each sublaminate corresponds with a number of fiber orientations.

5. The method of claim 1 wherein:

the stacking sequence rules define allowable ranges of ply counts for a sublaminate on a fiber orientation-by-fiber orientation basis.

6. The method of claim 1 wherein:

the stacking sequence rules define allowable numbers of consecutive plies of the same fiber orientation.

7. The method of claim 1 wherein:

the maximum number of layers is at least ten, and the fiber orientations comprise at least four distinct fiber orientations.

8. The method of claim 1 further comprising:

detecting a change to the stacking sequence rules; and creating a new library of sublaminates in response to detecting the change.

9. A non-transitory computer readable medium embodying programmed instructions which, when executed by a processor, are operable for performing a method of creating a library of sublaminates used in optimizing fiber orientations of a multi-layer composite part subdivided into panels that each comprise a fraction of the area of the composite part, the method comprising:

creating an integer tree of sublaminates that each comprise consecutively stacked layers having a unique sequence of fiber orientations;

checking the sublaminates, based on the fiber orientations of the consecutively stacked layers of the sublaminates, for compliance with stacking sequence rules that constrain how fiber orientations are sequenced;

pruning branches from the integer tree by removing sublaminates that do not comply with the stacking sequence rules;

generating new sublaminates that each include an additional layer, by, for each of multiple fiber orientations: selecting a sublaminate that was not removed; and creating a new branch within the integer tree by generating a new sublaminate by appending a layer having the fiber orientation to the selected sublaminate;

repeating the checking, the removing, and the generating at the integer tree until a maximum number of layers has been reached; and storing the sublaminates in memory as a library of available sublaminates for designing the composite part.

10. The medium of claim 9 wherein the method further comprises:

after the maximum number of layers has been reached, checking all sublaminates that have not yet been removed for compliance with additional stacking sequence rules; and pruning branches from the integer tree by removing sublaminates that do not comply with the additional stacking sequence rules.

11. The medium of claim 10 wherein:

the additional stacking sequence rules indicate that plies of a first fiber orientation must be paired with plies of a second fiber orientation.

12. The medium of claim 9 wherein:

repeating the checking, the removing, and the generating is performed recursively by traversing the integer tree, wherein each sublaminate comprises a node in the integer tree, and a number of branches from each sublaminate corresponds with a number of fiber orientations.

13. The medium of claim 9 wherein:

the stacking sequence rules define allowable ranges of ply counts for a sublaminate on a fiber orientation-by-fiber orientation basis.

14. The medium of claim 9 wherein:

the stacking sequence rules define allowable numbers of consecutive plies of the same fiber orientation.

15. The medium of claim 9 wherein:

the stacking sequence rules define consecutive sequences of fiber orientations that are disallowed.

16. The medium of claim 9 wherein the method further comprises:

detecting a change to the stacking sequence rules; and creating a new library of sublaminates in response to detecting the change.

17. An apparatus comprising:

a memory that stores stacking sequence rules that constrain how fiber orientations are permitted to be sequenced within a multi-layer composite part subdivided into panels that each comprise a fraction of the area of the composite part; and a controller that creates a library of sublaminates used in optimizing fiber orientations of the composite part, by: creating an integer tree of sublaminates that each comprise consecutively stacked layers having a unique sequence of fiber orientations, checking the sublaminates for compliance with the stacking sequence rules based on the fiber orientations of the consecutively stacked layers of the sublaminates; and pruning branches from the integer tree by removing sublaminates that do not comply with the stacking sequence rules, the controller generates new sublaminates that each include an additional layer, by, for each of multiple fiber orientations: selecting a sublaminate that was not removed, and creating a new branch within the integer tree by generating a new sublaminate by appending a layer having the fiber orientation to the selected sublaminate, and the controller repeats the checking, the removing, and the generating at the integer tree until a maximum number of layers has been reached, and stores the sublaminates in the memory as a library of available sublaminates for designing the composite part.

18. The apparatus of claim 17 wherein:

after the maximum number of layers has been reached, the controller further checks all sublaminates that have not yet been removed for compliance with additional stacking sequence rules, and prunes branches from the integer tree by removing sublaminates that do not comply with the additional stacking sequence rules.

19. The apparatus of claim 18 wherein:

the additional stacking sequence rules indicate that plies of a first fiber orientation must be paired with plies of a second fiber orientation.

20. The apparatus of claim 17 wherein:

the controller repeats the checking, the removing, and the generating recursively by traversing the integer tree, wherein each sublaminate comprises a node in the integer tree, and a number of branches from each sublaminate corresponds with a number of fiber orientations.

21. The apparatus of claim 17 wherein:

the stacking sequence rules define allowable ranges of ply counts for a sublaminate on a fiber orientation-by-fiber orientation basis.

22. The apparatus of claim 17 wherein:

the stacking sequence rules define allowable numbers of consecutive plies of the same fiber orientation.

23. The apparatus of claim 17 wherein:

the stacking sequence rules define consecutive sequences of fiber orientations that are disallowed.

24. The apparatus of claim 17 wherein:

the controller detects a change to the stacking sequence rules, and creates a new library of sublaminates in response to detecting the change.

* * * * *